United States Patent [19]

Schwaiger

[11] Patent Number: 4,757,135
[45] Date of Patent: * Jul. 12, 1988

[54] BICYCLIC FORMAZAN COMPOUNDS CONTAINING A BETA-SULFATOETHYL-SULFONYL OR VINYL SULFONYL GROUP, SUITABLE AS FIBER REACTIVE DYESTUFFS

[75] Inventor: Günther Schwaiger, Frankfurt am Main, Fed. Rep. of Germany

[73] Assignee: Hoechst Aktiengesellschaft, Frankfurt am Main, Fed. Rep. of Germany

[*] Notice: The portion of the term of this patent subsequent to Aug. 19, 2003 has been disclaimed.

[21] Appl. No.: 915,941

[22] Filed: Oct. 2, 1986

Related U.S. Application Data

[63] Continuation of Ser. No. 793,680, Oct. 31, 1985, abandoned.

[30] Foreign Application Priority Data

Nov. 3, 1984 [DE] Fed. Rep. of Germany ....... 3440265

[51] Int. Cl.⁴ .................... C09B 50/00; C09B 62/503; D06P 1/384; D06P 3/66
[52] U.S. Cl. .................................. 534/618; 534/602; 534/652
[58] Field of Search ......................... 534/618

[56] References Cited

U.S. PATENT DOCUMENTS

| | | | |
|---|---|---|---|
| 3,068,219 | 12/1962 | Beffa et al. | 534/618 |
| 4,336,190 | 6/1982 | Schwaiger et al. | 534/618 |
| 4,370,145 | 1/1983 | Schwaiger et al. | 534/618 |
| 4,556,706 | 12/1985 | Hegar et al. | 534/618 |
| 4,607,098 | 8/1986 | Schwaiger | 534/618 |

FOREIGN PATENT DOCUMENTS

| | | | |
|---|---|---|---|
| 0028787 | 5/1981 | European Pat. Off. | 534/618 |
| 0028788 | 5/1981 | European Pat. Off. | 534/618 |
| 1062851 | 1/1960 | Fed. Rep. of Germany | 534/618 |
| 441571 | 1/1968 | Switzerland | 534/618 |
| 963426 | 7/1964 | United Kingdom | 534/618 |
| 1194504 | 6/1970 | United Kingdom | 534/618 |

Primary Examiner—Floyd D. Higel

[57] ABSTRACT

Water-soluble copper formazan compounds of the general formula

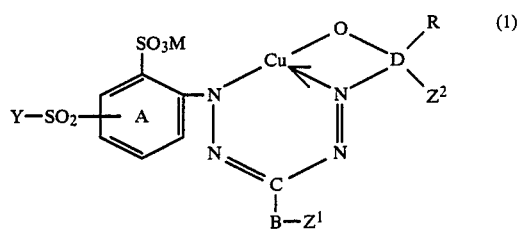

in which:
Y is vinyl or ethyl which is substituted by a substituent eliminatable under alkaline conditions; the benzene nucleus A can be substituted by further substituents;
M is hydrogen or a metal;
B is substituted or unsubstituted phenylene or naphthylene;
$Z^1$ is hydrogen or a water-solubilizing group, or $-B-Z^1$ together denote hydrogen, carboxy, cyano or nitro;
D is a substituted or unsubstituted benzene or naphthalene radical; and
R is hydrogen or a group of the formula

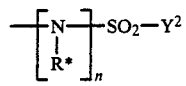

in which R* is hydrogen or a substituted or unsubstituted lower alkyl, n denotes the number zero or 1, and $Y^2$ is defined in the same manner as Y.

These copper formazan compounds possess fiber-reactive dye properties and dye particular cellulose fiber materials in deep reddish blue to greenish blue fast shades.

21 Claims, No Drawings

BICYCLIC FORMAZAN COMPOUNDS CONTAINING A BETA-SULFATOETHYL-SULFONYL OR VINYL SULFONYL GROUP, SUITABLE AS FIBER REACTIVE DYESTUFFS

This case is a continuation of my copending application, Ser. No. 793,680 filed Oct. 31, 1985, now abandoned.

The present invention is in the technical field of metal complex formazan dyes having fiber-reactive properties.

British Pat. No. 1,194,504 already discloses so-called bicyclic metal complex formazan dyes which contain a fiber-reactive group of the vinylsulfonyl series; and example of a dye of this type is the compound of the formula

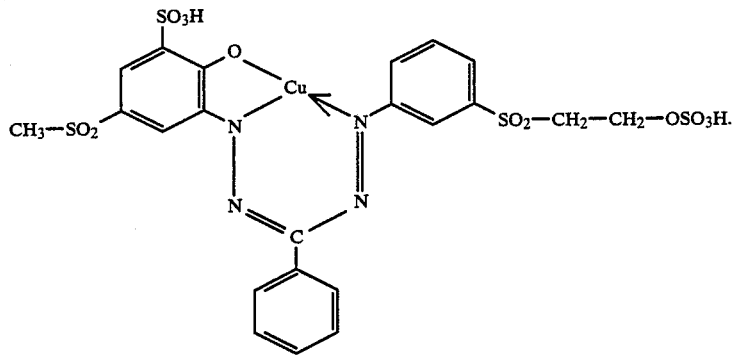

These known dyes have not only the disadvantage that the preparation of the phenylhydrazine components substituted in the ortho-position by hydroxy has in the majority of cases been heretofore practically impossible, so that dyes of this type need to be prepared by the method described in German Pat. No. 1,062,851, with the consequence that costly and difficult to prepare coupling components, such as phenylformylacetate esters, are required, but also the disadvantage that they have certain deficiencies in their fastness and application properties.

The new copper complex formazan compounds found have good application properties and produce dyeings and prints having very good fastness properties. These new compounds have the general formula (1)

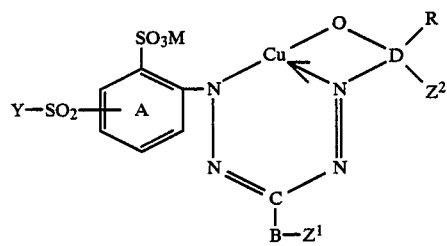

in which the individual moieties possess the following denotation:

Y is a vinyl group or a group of the formula (2)

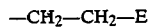 (2)

in which

E represents a hydroxy group or a substituent eliminatable under alkaline conditions; the benzene nucleus A can be substituted by further substituents, such as one or two, preferably one, substituent, such as, for example, by substituents from the group consisting of alkyl of 1 to 4 carbon atoms, such as methyl and ethyl, alkoxy of 1 to 4 carbon atoms, such as methoxy and ethoxy, halogen, such as fluorine and bromine and in particular chlorine, carboxy (which is of the formula —COOM where M has the denotation given hereinafter) and sulfo (which is of the formula —$SO_3M$ where M has the denotation given hereinafter); the group Y—$SO_2$— is bonded to the benzene nucleus A in meta-position relative to the indicated —$SO_3M$ group and para-position relative to the nitrogen atom or in para-position relative to the indicated —$SO_3M$ group and meta-position relative to the nitrogen atom;

M is a hydrogen atom or the equivalent of a metal, preferably an alkali metal, such as sodium, potassium or lithium, or of an alkaline earth metal, such as calcium;

B is a phenylene radical or a naphthylene radical which can both be substituted by further substituents, such as 1 or 2 substituents, the substituents being preferably selected from the group consisting of hydroxy, nitro, halogen, such as fluorine, bromine and chlorine, alkyl of 1 to 5 carbon atoms, preferably methyl and ethyl, alkoxy of 1 to 4 carbon atoms, preferably methoxy and ethoxy, carbalkoxy having 1 to 4 carbon atoms in the alkyl radical, such as carbomethoxy and carbethoxy, a group of the formula —$SO_2$—$Y^1$ (defined hereinafter), alkylsulfonyl of 1 to 4 carbon atoms, amino, acylamino having the acyl radical of an aliphatic carboxylic acid or sulfonic acid of 1 to 4 or 2 to 4 carbon in the alkyl, respectively alkenyl radical or of aptionally sulfo-, carboxy-, chlorine- and methyl-substituted benzoic or benzenesulfonic acid, sulfamoyl, N-monoalkylamino of 1 to 4 carbon atoms and N,N-dialkylamino having 1 to 4 carbon atoms in each of the alkyl radicals, or B is the radical of optionally $C_1$-$C_4$-alkyl-, $C_1$-$C_4$-alkoxy-, chlorine-, benzyl-, phenethyl- and/or phenyl-substituted furan, thiophene, pyrrole, imidazole, pyrazole, pyridine, pyrimidine, quinoline or benzimidazole, or B is a hydrogen atom or a carboxy, cyano or nitro group of a straight-chain or branched alkyl group of 1 to 8 carbon atoms, such as a methyl, ethyl, isopropyl, n-butyl, sec.-butyl, tert.-butyl, n-heptyl or n-octyl group, or a straight-chain or branched alkenyl group of 2 to 8 carbon atoms, such as a vinyl or allyl group, it being possible for these alkyl and alkenyl groups to be additionally substituted by a phenyl radical which in turn can be substituted by substituents from the group consisting of methyl, ethyl, methoxy, ethoxy, fluorine, chlorine, bromine and sulfamoyl;

D is a benzene or naphthalene nucleus to which the oxygen atom and the nitrogen atom are bonded in ortho-position relative to each other and each of which can be substituted by further substituents, such as by 1 or 2, preferably one, substituent, preferably from the group consisting of halogen, such as fluorine, bromine and in particular chlorine, nitro, hydroxy, alkyl of 1 to 5 carbon atoms, such as methyl, alkylaminoalkyl having alkyl radicals of 1 to 5 carbon atoms each, such as methylaminomethyl, alkoxy of 1 to 4 carbon atoms, such as methoxy and ethoxy, alkylsulfonyl of 1 to 4 carbon atoms, such as methylsulfonyl and ethylsulfonyl, phenylsulfonyl, sulfamoyl, N-monoalkylsulfamoyl of 1 to 4 carbon atoms, N,N-dialkyl-sulfamoyl having 1 to 4 carbon atoms in each of the alkyl radicals, alkanoylamino of 2 to 5 carbon atoms, such as acetylamino, aroylamino, such as benzoylamino, N-monoalkylamino of 1 to 4 carbon atoms, N,N-dialkylamino having 1 to 4 carbon atoms in each of the alkyl radicals, phenyl and substituted phenyl, such as phenyl which is substituted by sulfo, carboxy, chlorine, methyl and/or methoxy;

R is a hydrogen atom or a group, defined below, of the formula (2a)

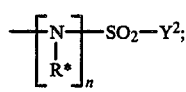
(2a)

$Z^1$ is a hydrogen atom or a water-solubilizing group, such as a carboxy or phosphono group and as the preferred water-solubilizing group the sulfo group, which is bonded once or twice to aliphatic carbon atoms of B or to aromatic carbon atoms of B, preferably to aromatic carbon atoms;

$Z^2$ is a hydrogen atom or a water-solubilizing group, such as a carboxy or phosphono group and as the preferred water-solubilizing group the sulfo group, which is bonded once or twice to aliphatic carbon atoms of substituents on D or to aromatic carbon atoms of D, preferably to aromatic carbon atoms;

R* is a hydrogen atom or an alkyl group of 1 to 4 carbon atoms, such as a methyl or ethyl group, which can be substituted by a hydroxy, sulfato, sulfo or carboxy group;

n is the number zero or 1;

$Y^1$ is a vinyl group or a group of the general formula (2b)

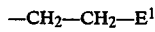
(2b)

in which $E^1$ represents a hydroxy group or a substituent eliminatable under alkaline conditions;

$Y_2$ is a vinyl group or a group of the general formula (2c)

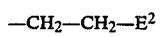
(2c)

in which $E^2$ denotes a hydroxy group or a substituent eliminatable under alkaline conditions.

The groups of formulae $-SO_2-Y$, $-SO_2-Y^1$ and $-SO_2-Y^2$ can have denotations identical to or different from one another, but advantageously they do not all stand for β-hydroxyethylsulfonyl groups at the same time. The substituents E, $E^1$ and $E^2$ which are eliminatable under alkaline conditions are for example a halogen atom, such as a chlorine or bromine atom, a lower alkanoyloxy group, such as the acetyloxy group, an aroyloxy group, such as the benzoyloxy or sulfobenzoyloxy group, an arylsulfonyloxy group, such as the toluyloxy group, a lower dialkylamino group, such as the dimethylamino or diethylamino group, a phosphato group (which is of the formula $-OPO_3M_2$ where M has the abovementioned denotation), a thiosulfato group (which is of the formula $-S-SO_3M$ where M has the abovementioned denotation) or a sulfato group (which is of the formula $-OSO_3M$ where M has the abovementioned denotation). Preferably Y, $Y^1$ and $Y^2$ in the new compounds of the general formula (1) are vinyl groups and in particular β-sulfatoethyl groups.

Insofar as B is an abovementioned phenyl-substituted alkyl or alkenyl radical, it is preferably the benzyl or styryl radical. $Z^1$ and $Z^2$ can have denotations which are identical to or different from each other. Insofar as the $Z^1$s or $Z^2$s are each bonded twice to the molecule, each can have different denotations. $Z^1$ is preferably bonded to B in the meta- or para-position relative to the carbon atom of the heterocyclic copper complex ring.

Preference is given to compounds of the general formula (1) in which $Z^1$ or $Z^2$ or both each denote a sulfo group.

The new compounds of the general formula (1) can be present in acid form. They are preferably in the form of their salts, in particular the abovementioned alkali metal and alkaline earth metal salts. They are used, preferably in the form of their alkali metal salts, for dyeing (in the general sense as including printing) hydroxy- and amino- and carboxamido-containing materials.

Of the novel compounds of the general formula (1), preference is given to those in which the $-SO_2-Y$ group is in the meta-position relative to the nitrogen atom and at the same time in the para-position relative to the $-SO_3M$ group. Preference is also given to those in which B is a naphthylene radical or preferably a phenylene radical which can each be unsubstituted by further substituents or be substituted by 1 or 2 further substituents from the group consisting of chlorine, methyl, methoxy, ethoxy, nitro, hydroxy, methylsulfonyl, ethylsulfonyl, β-hydroxyethylsulfonyl, β-sulfatoethylsulfonyl, carbethoxy and carbomethoxy and $Z^1$ stands for hydrogen atom or one or two sulfo groups or a sulfo and a carboxy group, and also to those in which D is a naphthalene nucleus or preferably a benzene nucleus which can each be unsubstituted by further substituents or be substituted by 1 or 2 further substituents from the group consisting of chlorine, nitro, hydroxy, acetamino, methyl, methylaminomethyl, methoxy, methylsulfonyl and ethylsulfonyl, R denotes a hydrogen atom or a β-hydroxyethylsulfonyl or β-sulfatoethylsulfonyl group and $Z^2$ represents a hydrogen atom or one or two sulfo groups.

Of these, emphasis is to be accorded to compounds of the general formula (3)

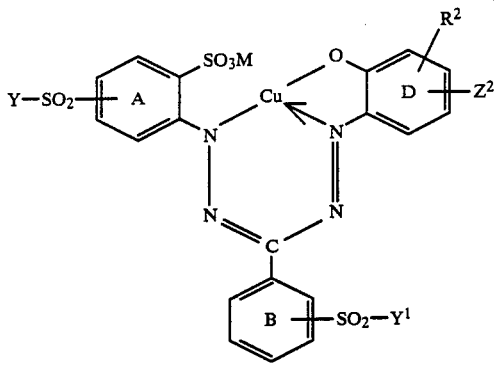

in which M, Y and $Y^1$ possess the abovementioned, in particular preferred, denotations, Y and $Y^1$ denote in particular β-sulfatoethyl groups, $R^2$ is a group of the formula $-SO_2-Y^2$ in which $Y^2$ has the abovementioned, in particular preferred, denotation and represents in particular a β-sulfatoethylsulfonyl group, or $R^2$ is an alkylsulfonyl group of 1 to 4 carbon atoms, such as the methylsulfonyl or ethylsulfonyl group, and $Z^2$ denotes a hydrogen atom or a sulfo group which is bonded to the benzene nucleus D in ortho-position relative to the oxygen atom, the benzene nuclei A, B and D preferably not containing further substituents other than those indicated here, or in which $Z^2$ denotes a sulfo group which is preferably in the para-position relative to the oxy group and $R^2$ herein denotes a hydrogen atom or, in meta-position relative to this $Z^2$ sulfo group, an acetylamino group or a methyl group, a nitro group or a sulfo group or a chlorine atom, the benzene nuclei A, B and D preferably not containing further substituents other than those indicated here.

Particular preference is given to compounds of the general formula (4)

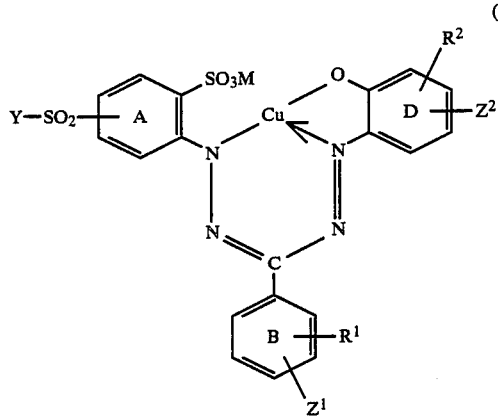

in which M and Y possess the abovementioned, in particular preferred, denotations and Y preferably is a β-sulfatoethyl group, $R^1$ denotes a hydrogen atom or a methyl or methoxy group or a chlorine atom, bonded to B in ortho-position or preferably in meta- or para-position relative to the carbon atom of the heterocyclic copper complex ring, $Z^1$ denotes a hydrogen atom or a sulfo group which is bonded in ortho-position, preferably in meta- or para-position, relative to the carbon atom of the heterocyclic copper complex ring, and $Z^2$ is a sulfo group which is bonded to D in para-position relative to the nitrogen atom, the benzene nuclei A, B and D preferably not containing further substituents other than those indicated here, or in which M, Y, $R^1$ and $Z^1$ have the denotations just mentioned for the formula (4), $Z^2$ is a sulfo group bonded to D in para-position relative to the oxygen atom and $R^2$ stands for a hydrogen atom or a chlorine atom bonded to D in ortho-position relative to the oxygen atom, or represents an acetylamino, methyl, nitro or sulfo group bonded to D in ortho-position relative to the oxygen atom, the benzene nuclei A, B and D preferably not containing further substituents other than those indicated here, or in which M, Y, $R^1$ and $Z^1$ have the denotations just mentioned for the formula (4) and $Z^2$ is a sulfo group bonded to D in ortho-position relative to the oxygen atom and $R^2$ is bonded to D in meta-position or para-position relative to $Z^2$ and denotes an alkylsulfonyl group of 1 to 4 carbon atoms, such as in particular the methylsulfonyl and ethylsulfonyl groups, a chlorine atom, an acetylamino group or a methyl group.

Particular preference is also given to compounds of the general formula (5)

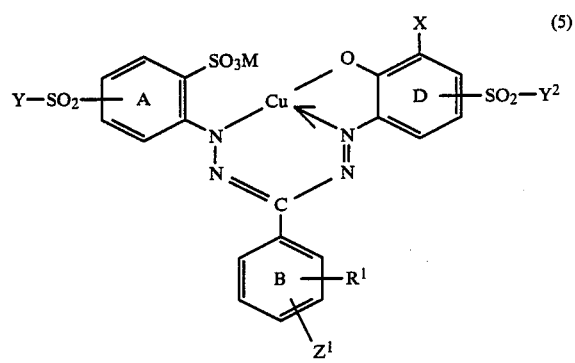

in which M, Y and $Y^2$ have the abovementioned, in particular preferred, denotations, Y and $Y^2$ denote in particular β-sulfatoethyl groups, $R^1$ is a hydrogen atom or a methyl or methoxy group or chlorine atom, bonded to B in ortho-position, preferably in meta- or para-postition, relative to the carbon atom of the hetero-cyclic copper complex ring, $Z^1$ stands for a hydrogen atom or denotes a sulfo group which is bonded to B in ortho-position, preferably in meta- or para-position, relative to the carbon atom of the heterocyclic copper complex ring, and X is either a hydrogen atom (in which case the β-sulfatoethylsulfonyl group bonded to D is in the ortho- or meta-position relative to X) or a sulfo group relative to which the β-sulfatoethylsulfonyl group bonded to D is in the meta-position, the benzene nuclei A, B and D preferably not containing further substituents other than those indicated here.

The present invention also relates to a process for preparing the abovementioned and defined compounds of the general formula (1), which comprises reacting an aromatic hydrazone compound of the general formula (6)

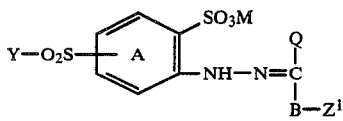

(6)

in which A, B, M, Y and $Z^1$ have the abovementioned denotations and Q denotes a hydrogen atom or a substituent replaceable by azo coupling, for example a formyl group or caboxy group or an optionally modified group hydrolyzable to a carboxy group, such as a cyano, carbalkoxy or carboxamido group, with the diazonium compound of an aromatic amine of the general formula (7)

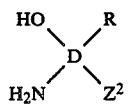

(7)

in which D, R and $Z^2$ have the abovementioned denotations, and with a copper-donating agent, the components being chosen in such a way that $Z^1$ and $Z^2$ meet the above-mentioned conditions.

The process according to the invention can be carried out in conventional manner analogously to known procedures for preparing metal complex formazan dyes. The process according to the invention is preferably carried out at a pH between 4 and 7, in particular between 5 and 6, and at a temperature between about 0° C. and 80° C. The addition of the reactants can be in any order, but the coupling reaction within the pH range between about 4 and about 6 only proceeds in the presence of copper ions as a threecomponent reaction.

The copper-donating compounds can be for example the simple and complex salts of copper, such as, for example, copper sulfate, copper chloride, copper acetate and copper carbonate and the copper salts of salicylic acid or tartaric acid.

If copper salts of mineral acids are used, the reaction is advantageously carried out in the presence of an acidneutralizing agent, such as, for example, an alkali metal hydroxide or carbonate or an alkali metal salt of a lower alkanoic acid, such as acetic acid, or a basic alkali metal salt of phosphoric acid. Such alkali metal compounds are in particular the sodium and potassium compounds, preferably for example sodium hydroxide, potassium hydroxide, sodium carbonate, potassium carbonate, sodium bicarbonate, sodium acetate, disodium hydrogenphosphate and trisodium phosphate.

The copper-donating agent is used in equimolar amounts, so that there is one heavy metal per molecule of the compound of the formula (1). The metallization customarily goes to completion even at room temperature (15° to 25° C.); but frequently slight heating, for example to 60° to 80° C., or an excess of the hydrazone component (6), for example an excess of 10 to 20%, is advantageous.

A procedure for preparing the copper complex formazan compounds of the general formula (1) is for example as follows: the hydrazone compound of the general formula (6) is dissolved with an alkali, such as sodium bicarbonate, sodium carbonate, in water at 0° to 10° C. while the pH is preferably at 5 to 6. The diazonium salt solution of the amine of the formula (7) is then added, while the pH of the reaction solution is not allowed to become either too alkaline or too acid, in order on the one hand, for example, not to damage the sulfatoethylsulfonyl group in the alkaline range and on the other to avoid a precipitation of the hydrazone and hence a heterogeneous reaction in the acid medium. Preferably the reaction is carried out at a pH between 4 and 7, in particular 5 and 6. However, it is also possible to add the hydrazone in the dissolved or undissolved form to the still weakly acid (pH 3–4) diazo solution. At first the reaction temperature should ideally not exceed 15° C. or even better 10° C.

The third component, namely the copper-donating agent, such as, for example, copper sulfate, is added in equimolar quantities simultaneously with the diazo component, preferably after the diazo component, either in solid form or in the form of an aqueous solution.

The copper reaction is likewise advantageously carried out at a pH of 4 to 7, in particular 4 to 6. Metallization and coupling reactions proceed simultaneously side by side. The metallization reaction proceeds comparatively rapidly. Before the isolation of the synthesized copper complex formazan compound, it is advantageous, as mentioned above, to heat the reaction mixture, for example to 40° to 60° C. or even as high as about 80° C., in order to speed up the coupling and metallization or obtain a quantitative yield and to effect fast clarification by means of kieselguhr.

The pH is then brought to 5 to 6, and the synthesized copper complex formazan compound according to the invention is isolated in a conventional manner, for example by salting out by means of an electrolyte, such as sodium chloride or potassium chloride.

If desired, the compound can also be isolated by evaporating the solution, for example by spray-drying.

The compounds according to the invention in which Y, $Y^1$ and/or $Y^2$ are equal to the vinyl group can also be prepared in a manner according to the invention by treating a corresponding copper complex formazan compound of the formula (1) in which Y, $Y^1$ and/or $Y^2$ denote a β-sulfatoethyl group—in a manner which is perfectly customary for this reaction—in alkaline aqueous solution at a pH between 8 and 10, for example by means of sodium hydroxide solution or sodium carbonate, and at elevated temperature, for example at about 40° to 60° C.

The β-thiosulfatoethylsulfonyl compounds of the general formula (1) can similarly be prepared in a manner according to the invention by reacting a vinylsulfonyl compound according to the invention with a salt of thiosulfuric acid, such as, for example, sodium thiosulfate—advantageously in excess, preferably of 20 to 40 mol %, of thiosulfate—in aqueous weakly acid solution, advantageously at a pH between 5 and 6.8, and at elevated temperature, for example at 30° to 80° C., in particular 60° to 75° C.

A further variant of the process according to the invention for preparing compounds of the general formula (1) where E, $E^1$ and/or $E^2$ are equal to an ester group can be effected in accordance with the procedure mentioned at the beginning which involved starting compounds of the general formulae (6) and (7) and a copper-donating agent by using as starting compounds such compounds in which E, $E^1$ and $E^2$ denote a hydroxy group. In this version, also an alkaline range, such as a pH between 4 and 14, can be chosen to give copper complex formazan compounds which initially contain the β-hydroxyethylsulfonyl group(s). By this way, the coupling reaction itself may be carried out at a pH between 10 and 13, preferably about 12, and the coppering reaction in the presence of complexing agents such as tartaric acid or citric acid at a pH between about 7 and 14 or without complexing agents at a pH of 4 to 7. The β-hydroxyethylsulfonyl copper complex formazan compound thus prepared can then be converted in accordance with the invention but analogously to perfectly conventional and known procedures, by esterification into a compound of the general formula (1) in which Y, $Y^1$ and/or $Y^2$ denote an esterified ethyl group, such as, for example, a β-sulfato, β-phosphato, β-aryloyloxy or β-alkanoyloxyethyl group. Preferably the esterification to give the sulfato compound is effected by means of a sulfating agent, such as preferably amidosulfonic acid or chlorosulfonic acid, in the presence of pyridine.

The hydrazone compounds of the general formula (6) which serve as starting compounds are obtained from the corresponding phenylhydrazines of the general formula (8)

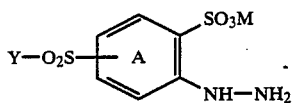
(8)

(where A, M and Y have the abovementioned designation), if desired without their intermediate isolation, by reaction with an aldehyde of the general formula (9)

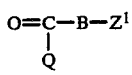
(9)

(where B, Q and $Z^1$ have the abovementioned designation) at a pH between less than 1 and 8, preferably between 5 and 6. The phenylhydrazines (8) can be prepared analogously to known procedures, for example from the corresponding diazonium compounds by reduction by means of tin(II) chloride dihydrate in aqueous hydrochloric acid or salts of sulfurous acid and hydrolysis of the intermediate N-sulfonic acids by means of mineral acids.

If Y in the hydrazone (6) or hydrazine (8) stands for a β-hydroxyethyl group, these compounds can be converted in perfectly conventional and known manner into their sulfuric acid half-esters where Y is equal to a β-sulfatoethyl group, for example by adding the dried compound to 96-100% strength or $SO_3$-containing sulfuric acid and precipitating and isolating the sulfato compound by addition of or pouring on ice, neutralization up to a pH of 4 to 6 by means of $CaCO_3/Na_2CO_3$ and salting out with an electrolyte.

The hydrazone compounds of the general formula (6) where Q is equal to the detachable group mentioned can also be obtained in perfectly conventional manner by coupling a twice-couplable methine or methylene compound which contains the structural portion of the $Z^1$—B— moiety with the diazonium compound of an amine of the general formula (10)

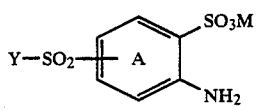
(10)

(where A, M and Y have the abovementioned denotations). The twice-couplable methylene or methine compounds which, after the coupling has been effected, still contain an optionally modified carboxy group at the methine carbon can be for example diethyl malontes and preferably for example alkyl phenylformylacetates, such as ethyl phenylformylacetate or the corresponding nitrile, and also alkyl chlorophenylformylacetates, and also alkyl benzylformylacetates, phenylcyanoacetic acid, alkyl phenylcyanoacetates, phenylacetamide, alkyl α-phenylacetoacetate, α-phenylacetoacetonitrile or alkyl naphthylformylacetates.

Aromatic amines of the general formula (10) which can be used as starting compounds for hydrazines of the formula (8) and hence for hydrozones of the formula (6) are for example 2-amino-4-(2-hydroxyethylsulfonyl)-benzenesulfonic acid, 2-amino-4-(2-sulfatoethylsulfonyl)-benzenesulfonic acid, 2-amino-4-(2-hydroxyethylsulfonyl)-benzene-1,5-disulfonic acid, 2-amino-4-(2-sulfatoethylsulfonyl)-benzene-1,5-disulfonic acid, 2-amino-5-(2-hydroxyethylsulfonyl)-benzenesulfonic acid and 2-amino-5-(2-sulfatoethylsulfonyl)-benzenesulfonic acid. These compounds are known and can be prepared by sulfonation of the corresponding β-hydroxyethylsulfonylanilines or by replacement of the chlorine atom by a sulfo group by means of sodium sulfite/bisulfite and subsequent reduction of the nitro group in a corresponding chloronitrophenyl β-hydroxyethyl sulfone, such as, for example, in 1-chloro-2-nitrophenyl-4-β-hydroxyethyl-sulfone (Example 5 of German Patent No. 859,462).

Aldehydes of the general formula (9) are for example benzaldehyde, 2-, 3- or 4-methylbenzaldehyde, 4-methylbenzaldehyde-3-sulfonic acid, 2-, 3- or 4-methoxybenzaldehyde, 4-methoxy-3-chloro-benzaldehyde, 2-, 3- or 4-nitrobenzaldehyde, 2-, 3- or 4-hydroxybenzaldehyde, 2-, 3- or 4-chlorobenzaldehyde, 3,4- or 2,4-dichlorobenzaldehyde, 2-chlorobenzaldehyde-5-sulfonic acid, 4-chlorobenzaldehyde-2-sulfonic acid, benzaldehyde-2-sulfonic acid, benzaldehyde-3-sulfonic acid, benzaldehyde-4-sulfonic acid, benzaldehyde-2,4-disulfonic acid, 4-β-hydroxyethylsulfonylbenzaldehyde, 4-benzenesulfonamidosalicylaldehyde, 4dimethylaminobenzaldehyde, 4-diethylaminobenzaldehyde, 1-naphthaldehyde, 2-naphthaldehyde, furan-2-aldehyde, thiophene-2-aldehyde, pyrrole-2-aldehyde, imidazole-2-aldehyde, pyrazole-5-aldehyde, pyridine-2-aldehyde, pyridine-3-aldehyde, pyridine-4-aldehyde, pyrimidine-5-aldehyde, quinoline-4-aldehyde, benzimidazole-2-aldehyde, formaldehyde, acetaldehyde, propionalaldehyde, n-butylaldehyde, oenanthaldehyde, acrylaldehyde, crotonaldehyde, phenacetaldehyde, cinnamaldehyde and vanilline.

Diazo components of the general formula (7) are for example 4-(2-sulfatoethylsulfonyl)-2-aminophenol, 5-(2-sulfatoethylsulfonyl)-2-aminophenol, 4-(2-sulfatoethylsulfonyl)-2-aminophenol-6-sulfonic acid and their vinylsulfonyl and β-thiosulfatoethylsulfonyl derivatives, such as, for example, 4-vinylsulfonyl-2-aminophenol-6-sulfonic acid and 4-(2-thiosulfatoethylsulfonyl)-2-aminophenol-6-sulfonic acid, and also the 2-hydroxyethyl sulfones, 2-phosphatoethyl sulfones, 2-alkylsulfatoethyl sulfones, 2-arylsulfatoethyl sulfones, 2-alkylcarbonatoethyl sulfones, 2-arylcarbonatoethyl sulfones, 2-chloroethyl sulfones, 2-bromoethyl sulfones of the above 2-aminophenols, and also carbyl sulfate derivatives, such as (2-sulfatoethylsulfonylamino)- or (2-sulfatoethylsulfonylalkylamino)-2-aminophenols, and also ethanolamine derivatives, such as (2-sulfatoethylaminosulfonyl)-2-aminophenols, and further, for example, 2-aminophenol, 2-aminophenol-4- or -5-sulfonic acid, 2-aminophenol-3,5- or -4,6-disulfonic acid, 2-aminophenol-4-sulfonamide, 2-aminophenol-4-sulfodimethylamide. 2-amino-4-ethylsulfonylphenol, 2-amino-4-ethylsulfonylphenol-6-sulfonic acid, 2-amino-1-hydroxy-4-methylsulfonylbenzene-6-sulfonic acid, 6-acetylamino-2-aminophenol-4-sulfonic acid, 6-chloro-2-aminophenol-4-sulfonic acid, 6-nitro-2-aminophenol-4-sulfonic acid, 4-chloro-2-aminophenol-6-sulfonic acid, 4-nitro-2-aminophenol-6-sulfonic acid, 2-amino-4-methylphenol-6-sulfonic acid, 5-amino-4-hydroxy-1,2-xylene, 5-amino-4-hydroxy-1,3-xylene, 4-, 5- or 6-chloro-2-aminophenol, 4,6-dichloro-2-aminophenol, 6-chloro-4-amino-3-hydroxytoluene, 4- or 5-nitro-2-aminophenol, 5-nitro-3-amino-4-hydroxytoluene, 4,6-dinitro-2-aminophenol, 6-chloro-4-nitro-2-aminophenol, 1-amino-2-naphthol, 2-amino-3-naphthol, 1-amino-2-naphthol-4- or -6-sulfonic acid, 1-amino-2-naphthol-3,6- or -4,6- or -4,7-disulfonic acid and 6-nitro-1-diazo-2-naphthol-4-sulfonic acid.

The copper complex formazan compounds according to the invention possess valuable dyestuff properties. They are preferably used for dyeing (in the general sense) hydroxy-, amino- and/or carboxamido-containing materials, for example in the form of sheetlike structures, such as paper and leather, or in substance, such as nylon and polyurethane, in particular such materials in fiber form.

The present invention accordingly also relates to the use of the compounds of the general formula (1) for dyeing (including mass coloration and printing) these materials, i.e. to processes for dyeing these materials in perfectly conventional manner in which a compound of the general formula (1) is used as colorant. Preferably the materials are used in the form of fiber materials, in particular in the form of textile fibers.

Hydroxy containing materials are natural or synthetic hydroxy containing materials, such as, for example, cellulose fiber materials or their regenerated products and polyvinyl alcohols.

Cellulose fiber materials are preferably cotton, but can also be other vegetable fibers, such as linen, hemp, jute and ramie fibers; regenerated cellulose fibers are for example staple viscose and filament viscose.

Carboxamido-containing materials are for example synthetic and natural polyamides and polyurethanes, in particular in the form of fibers, for example wool and other animal hairs, silk, leather, polyamide-66, polyamide-6, polyamide-11 and polyamide-4.

The compounds according to the invention can be applied to and fixed on the stated substrates, in particular the stated fiber materials, using the application techniques known for water-soluble dyes, in particular fiber-reactive dyes.

For instance, applied to cellulose fibers from a long liquor by the exhaust method in the presence of various acid-binding agents and if desired neutral salts, such as, for example, sodium chloride or sodium sulfate, they produce very good color yields. Dyeing is carried out at temperatures between 40° and 100° C., if desired at temperatures up to 120° C. under pressure, in the presence or absence of customary dyeing assistants, in an aqueous bath. To this effect, the material is introduced into the warm bath, which is gradually raised to the desired dyeing temperature at which the dyeing process is completed. If desired, it is also possible for the neutral salts which speed up the exhaustion of the dye not to be added to the bath until after the actual dyeing temperature has been reached.

Padding also produces on cellulose fibers excellent color yields, the dyes being fixed in conventional manner by leaving the dye to stand at room temperature or at elevated temperature, for example at up to about 60° C., by steaming or by means of dry heat.

The conventional printing methods for cellulose fibers likewise produce strong prints with well delineated contours and a clear white ground. The outcome of the prints depends only little on varying fixing conditions. The printing methods can be one-step methods wherein the material is printed with a print paste containing for example sodium bicarbonate or another acid-binding agent and the compound according to the invention, and the compound according to the invention is fixed on the fiber by subsequent steaming at 101° to 103° C., or by two-step methods wherein the material is printed for example with a neutral or weakly acid print paste which contains the compound according to the invention, and the compound according to the invention is then fixed on the material by passing the printed material through a hot electrolyte-containing alkaline bath or by overpadding with an alkaline electrolyte-containing padding liquor and subsequently leaving this overpadded material to stand or subjecting it to subsequent steaming or a subsequent treatment with dry heat. Both dyeing and printing give high degrees of fixation for the compounds according to the invention.

When fixing the dyes by means of dry heat in the customary thermofixing methods, hot air at 120° to 200° C. is used. Besides the customary steam at 101° to 103° C. it is also possible to use superheated steam and high-pressure steam at temperatures of up to 160° C.

The agents which have an acid-binding function and which cause the dyes to be fixed on the cellulose fibers are for example water-soluble basic salts of the alkali metals and alkaline earth metals of inorganic or organic acids or compounds which set alkali free on heating. They are in particular the alkali metal hydroxides and alkali metal salts of weak to medium inorganic or organic acids, the alkali metal compounds preferably to be understood as meaning the sodium and potassium compounds. Such acid-binding agents are for example sodium hydroxide, potassium hydroxide, sodium carbonate, sodium bicarbonate, sodium formate, sodium dihydrogenphosphate, disodium hydrogenphosphate, sodium trichloroacetate, sodium silicate and trisodium phosphate.

Treating the compounds according to the invention with the acid-binding agents, if desired combined with heating, the compounds according to the invention (dyes) are chemically bonded to the fiber; in particular the cellulose dyeings have excellent wet fastness properties after the customary aftertreatment in the form of rinsing to remove unfixed portions of the dye.

As regards the coloristic behaviour of the compounds according to the invention, it is particulalry noteworthy that they are distinguished by high stability in print pastes and padding liquors, even in the presence of alkali, by very high affinity from long liquors, by high buildup and high fixation rate in conventional dyeing and printing methods, in particular at low temperatures (i.e. room temperature and up to 50° C.), by an identical depth of shade when dyeing cotton and regenerated cellulose fibers, by the levelness of dyeings and prints prepared therewith and likewise by the uniform outcome of dyeings from long liquors in the presence of various quantities of electrolyte.

The dyeings on polyurethane fibers and polyamide fibers are customarily carried out from an acid medium. For instance, it is possible to add to the dyebath acetic acid and/or ammonium sulfate or acetic acid and ammonium acetate or sodium acetate in order to obtain the desired pH. To obtain acceptable dyeing levelness, it is advisable to add customary leveling assistants, such as, for example, those based on a reaction product of cyanuric chloride with three times the molar amount of an aminobenzene-sulfonic acid and/or of an aminonaphthalenesulfonic acid or based on a reaction product of for example stearylamine with ethylene oxide. As a rule, the material to be dyed is introduced at a temperature of around 40° C. into an initially weakly alkaline bath and is agitated therein for some time; the dyebath is then brought to a weakly acid, preferably weakly acetic acid, pH, and the actual dyeing is carried out at a temperature between 60° and 98° C. However, the dyeings can also be carried out at the boil or at temperatures up to 120° C. (under pressure). This can be followed by an aftertreatment in an ammoniacal bath.

The dyeings and prints prepared with the compounds according to the invention are distinguished by pure, predominantly blue, shades. In particular the dyeings and prints on cellulose fiber materials possess, as already mentioned, a high depth of shade and also a high light, wet-light and perspiration-light fastness, good hypochlorite bleach and chlorinated water fastness, good hot-press, cross-dyeing and rub fastness properties and furthermore excellent wet fastness properties, such as washing, fulling, alkali, acid and perspiration fastness properties and also an excellent stability to storage under acid conditions. Unfixed dye portions can be easily and completely washed off again from the fiber material, which is an essential prerequisite for the good wet fastness properties of the obtainable dyeings. Furthermore, the dyeings are stable to customary synthetic resin finishes. Some of the compounds according to the invention (dyes) are comparable with reactive dyes of the anthraquinone series in the purity of the hue and important fastness properties, but they are in addition readily dischargeable to white in cotton background dyeings.

The following examples serve to illustrate the invention. The parts and percentages mentioned therein are by weight, unless otherwise stated. Parts by weight relate to parts by volume as the kilogram relates to the liter.

The compounds described in the examples in the form of formulae are indicated in the form of the free acids; they are generally prepared and isolated in the form of their sodium or potassium salts and are used for dyeing in the form of their salts. Similarly, the starting compounds and components mentioned in the examples below, in particular the tabulated examples, in the form of the free acid can be used as such or in the form of their salts, preferably alkali metal salts, such as sodium or potassium salts, in the synthesis.

The absorption maxima ($\lambda_{max}$) of the compounds according to the invention were determined in aqueous solution.

EXAMPLE 1

(a) 281 parts of 2-amino-4-(2-hydroxyethylsulfonyl)-benzenesulfonic acid are diazotized in 500 parts of water and 500 parts of ice at 0° to 5° C. The aqueous diazo solution is added to a suspension of 650 parts of 40% strength sodium bisulfite solution and 180 parts of 33% strength aqueous sodium hydroxide solution, the mixture is stirred at 20° to 30° C. until the test for diazonium salt is negative, the temperature is raised to 60°–70° C. and after an hour 450 parts of 31% strength aqueous hydrochloric acid are added, the temperature is raised to 100° C. and the mixture is refluxed until all of the disulfonate has been hydrolyzed (about 3 h). After cooling down to 50° to 60° C., 110 parts of benzaldehyde are added. The precipitated 2-(2-benzylidenehydrazino)-4-(2-hydroxyethylsulfonyl)-benzenesulfonic acid is filtered off with suction at 10°–20° C. and is dried at 60°–80° C. under reduced pressure.

(b) 345 parts of the dry 2-(2-benzylidenehydrazino)-4-(2-hydroxyethylsulfonyl)-benzenesulfonic acid are added to 1000 parts of sulfuric acid (monohydrate); after quantitative esterification (after 10 h) the mixture is added to 2500 parts of ice. 2-(2-Benzylidenehydrazino)-4-(2-sulfoethylsulfonyl)-benzenesulfonic acid can then be isolated therefrom by precipitation with sodium chloride or be obtained as an aqueous neutral solution by bringing this acid solution to a pH of 5 with 900 parts of calcium carbonate and about 100 parts of sodium carbonate and at 60° C. filtering off the calcium sulfate with suction.

(c) 51 parts of the disodium salt of 2-(2-benzylidenehydrazino)-4-(2-sulfatoethylsulfonyl)-benzenesulfonic acid are added in the form of an aqueous solution to a diazo suspension which has been obtained by diazotizing 22 parts of 6-chloro-2-aminophenol-4-sulfonic acid and has been brought to pH 3 to 4. 25 parts of copper sulfate pentahydrate are added white the pH is maintained at 5 to 5.5 with sodium carbonate and the temperature is maintained at 15°–20° C. Stirring is continued at 20°–25° C. until the test for diazonium salt is negative, and the mixture is clarified by means of kieselguhr and filtration. The compound according to the invention is precipitated by means of an electrolyte such as sodium chloride or potassium chloride, is filtered off, is washed with dilute aqueous sodium chloride solution and is dried at 60° to 80° C. under reduced pressure.

The result obtained is a dark electrolyte-containing powder of an alkali metal salt (sodium salt) of the compound of the formula

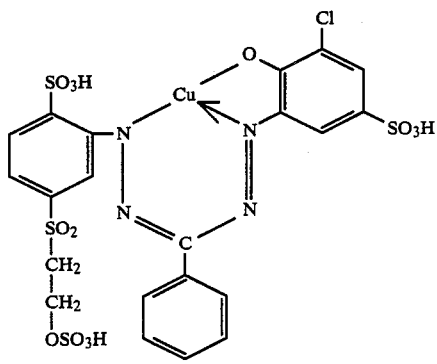

which gives a dark blue solution in water ($\lambda_{max}=595$ nm). This compound is very highly suitable for use as a dye and dyes cotton and regenerated cellulose fibers from long liquors in the presence of an acid-binding agent in reddish blue shades. The dyeings, aftertreated in conventional manner after a 10 minute soapoff and rinse with water, are found to be very light- and wet-fast. Particularly noteworthy among the wet fastness properties are the wash, fulling and perspiration fastness properties, the chlorine bleach and chlorinated water fastness, the wet-light and perspiration-light fastness and the high stability of prints to acid hydrolysis. Another noteworthy feature is the excellent dischargeability to white of a cotton background dyeing dyed with this.

EXAMPLE 2

47 parts of 2-(2-benzylidenehydrazino-4-(2-sulfatoethylsulfonyl)-benzenesulfonic acid are suspended in 400 parts of water and are dissolved at 10° to 20° C. by addition of sodium carbonate up to a pH of 5. The solution has added to it first of all an aqueous diazo suspension from 19 parts of 2-aminophenol-4-sulfonic acid, then 17 parts of sodium carbonate and gradually at 10° to 15° C. in the course of 15 minutes a solution of 25 parts of copper sulfate pentahydrate in 100 parts of water, while the pH is maintained at a value of 5 to 5.5 with a further 11 parts of sodium carbonate. Stirring is continued at 20° to 25° C. until the coupling is complete, the remperature is then raised to 50° C., the mixture is clarified with kieselguhr and by filtration, and the compound according to the invention is precipitated by means of sodium chloride or potassium chloride. Said compound is filtered off, is washed with dilute aqueous sodium chloride solution and is dried.

The result obtained is a dark electrolyte-containing powder of an alkali metal salt (sodium salt) of the compound of the general formula

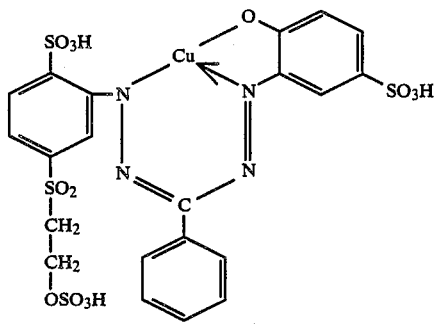

which gives a dark blue solution in water ($\lambda_{max}$=593 nm). This compound is likewise very highly suitable for use as a dye and has excellent fastness properties and other properties indicated in Example 1. The compound dyes cotton in bright reddish blue shades.

EXAMPLE 3

To prepare a compound according to the invention the procedure of Example 1 or 2 is followed, except that instead of using the diazonium salt used there the diazonium compound of 2-aminophenol-4,6-disulfonic acid is used in an equivalent amount, affording the alkali metal salt of a compound according to the invention of the general formula (1a)

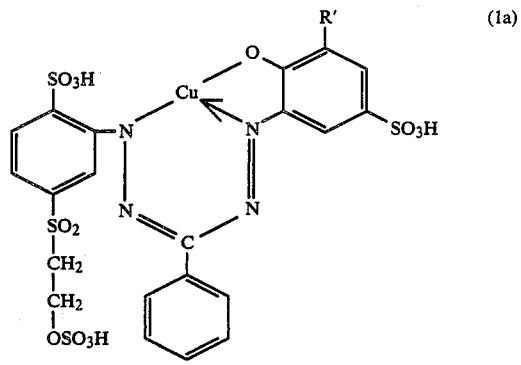

in which R' denotes a sulfo group. It gives a reddish blue solution in water ($\lambda_{max}$=601 nm) and has a good fastness and other properties indicated in Example 1. It dyes cotton in blue shades.

EXAMPLE 4

To prepare a compound according to the invention the procedure of Example 1 or 2 is followed, except that instead of using the diazonium salt used there the diazonium compound of 6-acetamino-2-aminophenol-4-sulfonic acid is used in an equivalent amount, affording the alkali metal salt of a compound according to the invention of the general formula (1a) indicated in Example 3 in which R' denotes the acetylamino group in this case. It gives a reddish blue soloution in water ($\lambda_{max}$=600 nm) and has a good fastness and other properties indicated in Example 1. It dyes cotton in reddish blue shades.

EXAMPLE 5

47 parts of 2-(benzylidenehydrazino)-4-(2-sulfatoethylsulfonyl)-benzenesulfonic acid are added to an aqueous diazo solution which has a pH of 2 to 3 and has been prepared by diazotizing 30 parts of 4-(2-sulfatoethylsulfonyl)-2-aminophenol in 500 parts of water, while maintaining a pH of 4.5 to 6.0, followed briefly thereafter by 25 parts of copper sulfate pentahydrate. The mixture is stirred at 20° to 25° C. until coupling is complete, and is clarified at 40° C., the compound according to the invention is precipitated by means of sodium chloride, is filtered off and is washed with dilute sodium chloride solution and the filter residue is dried.

The result obtained is a dark electrolyte-containing powder of an alkali metal salt (the sodium salt) of the compound according to the invention of a general formula (1b)

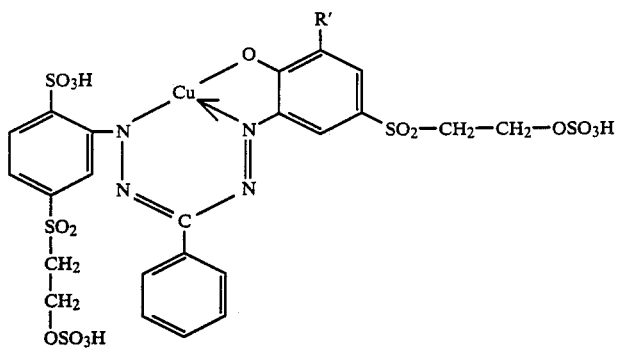

in which R' denotes a hydrogen atom. It gives a dark blue solution in water ($\lambda_{max}=590$ nm) and is highly suitable for use as a dye which has a high degree of fixation and a good fastness and other properties indicated in Example 1. Cotton is dyed in a reddish blue shade.

EXAMPLE 6

To prepare a compound according to the invention the procedure of any one of Examples 1 to 5 is followed, except that instead of using the diazonium salt used there the diazonium compound of 4-(2-sulfatoethylsulfonyl)-2-aminophenol-6-sulfonic acid is used in an equivalent amount, affording an alkali metal salt of a compound according to the invention of the general formula (1b) indicated in Example 5 in which R' in this instance denotes a sulfo group. It gives a reddish blue solution in water ($\lambda_{max}=598$ nm) and possesses the good fastness and other properties indicated in Example 1. It likewise dyes cotton in bright greenish blue shades.

EXAMPLE 7

To prepare a compound according to the invention the procedure of Example 1 or 2 is followed, except that instead of using the diazonium salt used there the diazonium compound of 5-(2-sulfatoethylsulfonyl)-2-aminophenol is used in an equivalent amount affording an alkali metal salt of a compound according to the invention of the formula parts of 31% strength aqueous hydrochloric acid are added at 60° C., and the mixture is heated to 100° C. While water is simultaneously distilled off, the hydrazodisulfonate is hydrolyzed to 2-hydrazino-4-(2-hydroxyethylsulfonyl)-benzenesulfonic acid. Concentrating to a third of the original volume is followed by cooling, removal of the precipitated hydrazine by filtration and drying.

(b) 240 parts of 2-hydrazino-4-(2-hydroxyethylsulfonyl)-benzenesulfonic acid are added to 900 parts of sulfuric acid (monohydrate). If desired, 40 parts of 20% strength oleum can additionally be added. The batch is stirred for 10 hours and is then stirred onto 3000 parts of ice and 1000 parts of water, and the hydrazine is isolated, for example by neutralization with calcium carbonate in the form of a neutral or weakly acid solution or by salting out by means of sodium chloride. The precipitated 2-hydrazino-4-(2-sulfatoethylsulfonyl)-benzenesulfonic acid is used moist.

(c) 38 parts of 2-hydrazino-4-(2-sulfatoethylsulfonyl)-benzenesulfonic acid are suspended in 300 parts of water and then dissolved with sodium carbonate up to pH 5.5. 22 parts of sodium benzaldehyde-4-sulfonate are added, and while pH 5 is maintained the batch is heated to 60° C. and subsequently stirred for an hour.

(d) To prepare a copper formazan compound according to the invention a procedure analogous to that of Example (1c) is followed but using, as the aqueous hydrazone salt solution, the aqueous solution of the hydra-

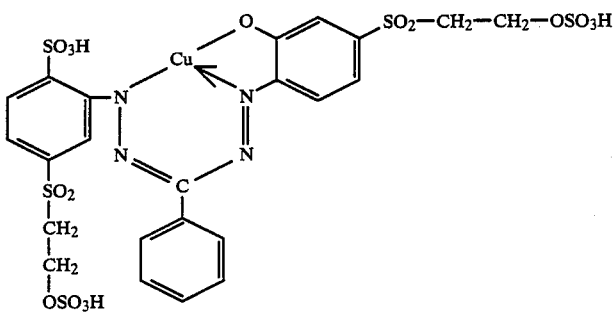

which gives a reddish blue solution in water ($\lambda_{max}=606$ nm). It possesses the good fastness and other properties indicated in Example 1. It likewise dyes cotton in reddish blue shades.

EXAMPLE 8

(a) 281 parts of 2-amino-4-(2-hydroxyethylsulfonyl)-benzenesulfonic acid are diazotized as in Example 1a and are converted with neutral sodium sulfite/sodium bisulfite suspension into the hydrazinedisulfonate; 150 zone salt solution prepared above in section (c). The compound according to the invention of the formula

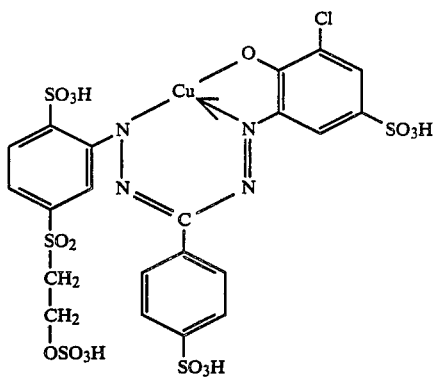

is obtained as its alkali metal salt (sodium salt) in the form of an electrolyte-containing powder.

This compound according to the invention ($\lambda_{max}=591$ nm in aqueous solution) likewise has very good dye properties and dyes for example cellulose fiber materials by the application and fixing methods customary in the art for fiber-reactive dyes in reddish blue shades having good fastness properties.

EXAMPLE 9

To prepare a compound according to the invention the procedure of Example 8 is followed, except that instead of using the diazonium salt used there the diazonium compound of 2-aminophenol-4-sulfonic acid is used in an equivalent amount, affording an alkali metal salt of a compound according to the invention of a general formula (1c)

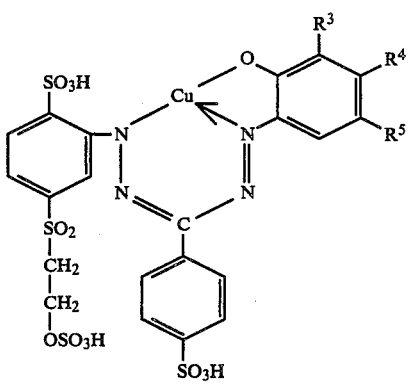

(1c)

in which $R^3$ and $R^4$ both stand for a hydrogen atom and $R^5$ denotes a sulfo group. It gives a reddish blue solution in water ($\lambda_{max}=589$ nm) and is very highly suitable for use as a fiber-reactive dye. Applied by the application methods customary in the art it produces for example on cellulose fiber materials strong reddish blue dyeings and prints having good fastness properties.

EXAMPLE 10

To prepare a compound according to the invention the procedure of Example 8 is followed, except that instead of using the diazonium salt used there the diazonium compound of 2-aminophenol-4,6-disulfonic acid is used in an equivalent amount, affording an alkali metal salt of a compound according to the invention of the general formula (1c) indicated in Example 9, in which $R^4$ is a hydrogen atom and $R^3$ and $R^5$ both stand for a sulfo group. It has a $\lambda_{max}$ of 597 nm in water and is very suitable for use as a fiber-reactive dye. Applied by the application methods customary in the art it produces for example on cellulose fiber materials strong reddish blue dyeings and prints having good fastness properties.

EXAMPLE 11

To prepare a compound according to the invention the procedure of Example 8 is followed, except that instead of using the diazonium salt used there the diazonium compound of 6-acetylamino-2-aminophenol-4-sulfonic acid is used in an equivalent amount, affording an alkali metal salt of a compound according to the invention of the general formula (1c) given in Example 9, in which $R^3$ stands for an acetylamino group, $R^4$ stands for a hydrogen atom and $R^5$ stands for a sulfo group. It has a $\lambda_{max}$ of 596 nm in water and is very highly suitable for use as a fiber-reactive dye. Applied by the application methods customary in the art it produces for example on cellulose fiber materials strong reddish blue dyeings and prints having good fastness properties.

EXAMPLE 12

To prepare a compound according to the invention the procedure of Example 8 is followed, except that instead of using the diazonium salt used there the diazonium compound of 4-(2-sulfatoethylsulfonyl)-2-aminophenol is used in an equivalent amount, affording an alkali metal salt of a compound according to the invention of the general formula (1c) indicated in Example 9, in which $R^3$ and $R^4$ both denote a hydrogen atom and $R^5$ stands for a $\beta$-sulfatoethylsulfonyl group. It has a $\lambda_{max}$ of 585 nm in water and is very highly suitable for use as a fiber-reactive dye. Applied by the application methods customary in the art it produces for example on cellulose fiber materials strong reddish blue dyeings and prints having good fastness properties.

EXAMPLE 13

To prepare a compound according to the invention the procedure of Example 8 is followed, except that instead of using the diazonium salt used there the diazonium compound of 4-(2-sulfatoethylsulfonyl)-2-aminophenol-6-sulfonic acid is used in an equivalent amount, affording an alkali metal salt of a compound according to the invention of the general formula (1c) indicated in Example 9, in which $R^3$ denotes a sulfo group, $R^4$ is a hydrogen atom and $R^5$ stands for a $\beta$-sulfatoethylsulfonyl group. It has a $\lambda_{max}$ of 594 nm in water and is very highly suitable for use as a fiber-reactive dye. Applied by the application methods customary in the art it produces for example on cellulose fiber materials strong reddish blue dyeings and prints having good fastness properties.

EXAMPLE 14

To prepare a compound according to the invention the procedure of Example 8 is followed, except that instead of using the diazonium salt used there the diazonium compound of 5-(2-sulfatoethylsulfonyl)-2-aminophenol is used in an equivalent amount, affording an alkali metal salt of a compound according to the invention of the general formula (1c) indicated in Example 9, in which $R^3$ and $R^5$ both stand for a hydrogen atom and $R^4$ denotes a $\beta$-sulfatoethylsulfonyl group. It has a $\lambda_{max}$ of 602 nm in water and is very suitable for use as a fiber-reactive dye. Applied by the application methods customary in the art it produces for example on cellulose fiber materials strong reddish blue dyeings and prints having good fastness properties.

EXAMPLE 15

(a) 281 parts of 2-amino-4-(2-hydroxyethylsulfonyl)-benzenesulfonic acid are diazotized as in Example 1a and are converted with neutral sodium sulfite/sodium bisulfite suspension into the hydrazinedisulfonyl; 150 parts of 32% strength aqueous hydrochloric acid are added at 60° C., and the mixture is heated to 100° C. While water is simultaneously distilled off, the hydrazodisulfonate is hydrolyzed to 2-hydrazino-4-(2-hydroxyethylsulfonyl)-benzenesulfonic acid. Concentrating to a third of the original volume, cooling and removal of the precipitated hydrazine by filtration, which is dried, are followed.

(b) 240 parts of 2-hydrazino-3-(2-hydroxyethylsulfonyl)-benzenesulfonic acid are added to 900 parts of sulfuric acid (monohydrate). If desired, 40 parts of 20% strength oleum can additionally be added. The batch is stirred for 10 hours and is then stirred onto 3000 parts of ice and 1000 parts of water, and the hydrazine is isolated, for example by neutralization with calcium carbonate in the form of a neutral or weakly acid solution or by salting out by means of sodium chloride. The precipitated 2-hydrazino-3-(2-sulfatoethylsulfonyl)-benzenesulfonic acid is used moist.

(c) 38 parts of 2-hydrazino-4-(2-sulfatoethylsulfonyl)-benzenesulfonic acid are suspended in 300 parts of water and then dissolved with sodium carbonate up to pH 5.5. 22 parts of sodium benzaldehyde-4-sulfonate are added, and while pH 5 is maintained the batch is heated to 60° C. and subsequently stirred for an hour.

(d) To prepare a copper formazan compound according to the invention a procedure analogous to that of Example 1(c) is followed but using, as the aqueous hydrazone salt solution, the aqueous solution of the hydrazone salt solution prepared above in section (c). The compound according to the invention of the formula

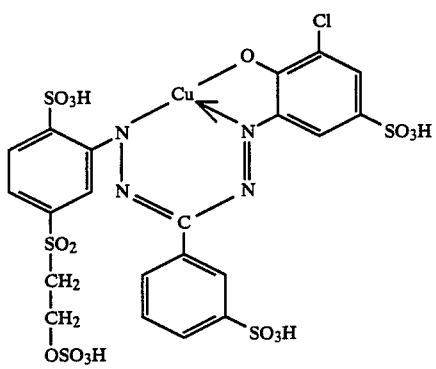

as its alkali metal salt (sodium salt) in the form of an electrolyte-containing powder. This compound according to the invention ($\lambda_{max}$=591 nm in aqueous solution) likewise has very good dye properties and dyes for example cellulose fiber materials by the application and fixing methods customary in the art for fiber-reactive dyes in reddish blue shades having good fastness properties.

EXAMPLE 16

To prepare a compound according to the invention the procedure of Example 15 is followed, except that instead of using the diazonium salt used there the diazonium compound of 2-aminophenol-5-sulfonic acid is used in an equivalent amount, affording an alkali metal salt of a compound according to the invention of a general formula (1d)

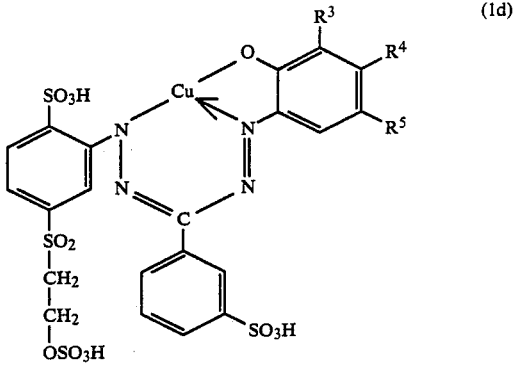

in which $R^3$ and $R^4$ both stand for a hydrogen atom and $R^5$ denotes a sulfo group. It has a $\lambda_{max}$ of 597 nm in water and is very highly suitable for use as a fiber-reactive dye. Applied by the application methods customary in the art it produces for example on cellulose fiber materials strong reddish blue dyeings and prints having good fastness properties.

EXAMPLE 17

To prepare a compound according to the invention the procedure of Example 15 is followed, except that instead of using the diazonium salt used there the diazonium compound of 2-aminophenol-4,6-disulfonic acid is used in an equivalent amount, affording an alkali metal salt of a compound according to the invention of the general formula (1d) indicated in Example 16, in which $R^4$ is a hydrogen atom and $R^3$ and $R^5$ both stand for a sulfo group. It has a $\lambda_{max}$ of 597 nm in water and is very suitable for use as a fiber-reactive dye. Applied by the application methods customary in the art it produces for example on cellulose fiber materials strong reddish blue dyeings and prints having good fastness properties.

EXAMPLE 18

To prepare a compound according to the invention the procedure of Example 15 is followed, except that instead of using the diazonium salt used there the diazonium compound of 6-acetylamino-2-aminophenol-4-sulfonic acid is used in an equivalent amount, affording an alkali metal salt of a compound according to the invention of the general formula (1d) given in Example 16, in which $R^3$ stands for an acetylamino group, $R^4$ stands for a hydrogen atom and $R^5$ stands for a sulfo group. It has a $\lambda_{max}$ of 596 nm in water and is very highly suitable for use as a fiber-reactive dye. Applied by the application methods customary in the art it produces for example on cellulose fiber materials strong reddish blue dyeings and prints having good fastness properties.

EXAMPLE 19

To prepare a compound according to the invention, the procedure of Example 15 as followed, except that instead of using the diazonium salt used there the diazonium compound of 4-(2-sulfatoethylsulfonyl)-2-aminophenol is used in an equivalent amount, affording an alkali metal salt of a compound according to the invention of the general formula (1d) indicated in Example 16, in which $R^3$ and $R^4$ both denote a hydrogen atom and $R^5$ stands for a β-sulfatoethylsulfonyl group. It has a $\lambda_{max}$ of 586 nm in water and is very highly suitable for use as a fiber-reactive dye. Applied by the application methods customary in the art it produces for example on cellulose fiber materials strong reddish blue dyeings and prints having good fastness properties.

EXAMPLE 20

To prepare a compound according to the invention the procedure of Example 15 is followed except that instead of using the diazonium salt used there the diazonium compound of 4-(2-sulfatoethylsulfonyl)-2-aminophenol-6-sulfonic acid is used in an equivalent amount, affording an alkali metal salt of a compound according to the invention of the general formula (1d) indicated in Example 16, in which $R^3$ denotes a sulfo group, $R^4$ is a hydrogen atom and $R^5$ stands for a β-sulfatoethylsulfonyl group. It gives a reddish blue solution in water ($\lambda_{max}=594$ nm) and is very highly suitable for use as a fiber-reactive dye. Applied by the application methods customary in the art it produces for example on cellulose fiber materials strong reddish blue dyeings and prints having food fastness properties.

EXAMPLE 21

To prepare a compound according to the invention the procedure of Example 15 is followed, except that instead of using the diazonium salt used there the diazonium compound of 5-(2-sulfatoethylsulfonyl)-2-aminophenol is used in an equivalent amount, affording an alkali metal salt of a compound according to the invention of the general formula (1d) indicated in Example 16, in which $R^4$ is a β-sulfatoethylsulfonyl group and $R^3$ and $R^5$ both stand for a hydrogen atom. It has a $\lambda_{max}$ of 602 nm in water and is very highly suitable for use as a fiber-reactive dye. Applied by the application methods customary in the art it produces for example on cellulose fiber materials strong reddish blue dyeings and prints having good fastness properties.

EXAMPLE 22

(a) 281 parts of 2-amino-5-(2-sulfatoethylsulfonyl)-benzenesulfonic acid are diazotized at 0° to 5° C. in 3000 parts of water/ice. The diazo solution is added to a solution of 700 parts of tin(II) chloride dihydrate in 700 parts of 31% strength aqueous hydrochloric acid; after 30 minutes of stirring below 10° C. the mixture is brought to pH 5 with 800 parts of sodium carbonate. While the pH of 5 is maintained the batch is heated to 50° C. and tin dioxide is removed by filtration with suction; 110 parts of benzaldehyde are added to the filtrate at 50° to 60° C., at which temperature the condensation reaction is completed. The batch is cooled down to 10° to 20° C., and the precipitated 2-(2-benzylidenehydrazino)-5-(2-sulfatoethylsulfonyl)-benzenesulfonic acid is filtered off with suction and is dried at 60° C. or used directly moist.

(b) To prepare a copper formazan compound according to the invention the procedure of Example 1 is followed: 47 parts of 2-(2-benzylidenehydrazino)-5-(2-sulfatoethylsulfonyl)-benzenesulfonic acid are reacted with a solution of a diazonium salt of 38 parts of 4-(2-sulfatoethylsulfonyl)-2-aminophenol-6-sulfonic acid and with 25 parts of copper sulfate pentahydrate. The compound according to the invention is precipitated by means of sodium chloride and isolated.

The result obtained is a dark electrolyte-containing powder of an alkali metal salt (sodium salt) of the compound of the formula

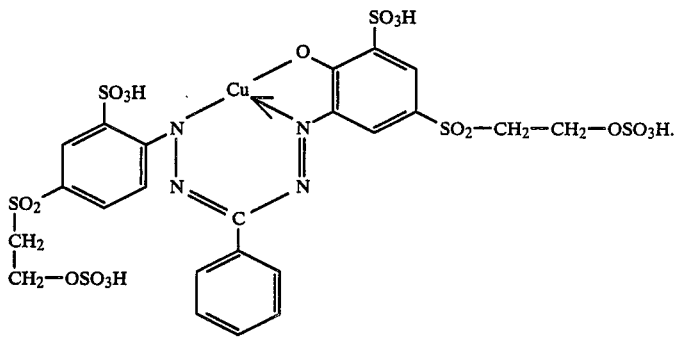

It gives a dark blue solution in water ($\lambda_{max}=606$ nm) and has very good dye properties. It dyes cotton with a high degree of fixation in bright greenish blue shades and has good fastness and other properties, as indicated in Example 1 and in the description.

EXAMPLES 23 TO 192

The tabled examples below describe further copper complex formazan compounds according to the invention in the form of their starting components. They can be prepared in a manner according to the invention, for example using one of the process variants described in the illustrative embodiments, in likewise excellent yield by reacting a copper-donating compound and the respective starting compounds mentioned in the following examples (the arylhydrazine compound of the general formula (8), the aldehyde compound of the general formula (9) and the aminophenol compound of the general formula (7)). They likewise possess good dyeing properties and produce dyeings and prints on polyamide and polyurethane fiber materials, in particular on cellulose fiber materials, in the shades, which have good fastness properties, which are indicated in the respective tabled example.

| | Compounds of the general formula (1) from: | | | Hue on cellulose ($\lambda_{max}$) |
|---|---|---|---|---|
| Example | Hydrazine component (8) | Aldehyde component (9) | Aminophenol (7) | |
| 23 | 2-Hydrazino-4-(2-sulfato-ethylsulfonyl)-benzene-sulfonic acid | Benzaldehyde | 2-Aminophenol-4-sulfonamide | reddish blue |
| 24 | 2-Hydrazino-4-(2-sulfato-ethylsulfonyl)-benzene-sulfonic acid | Benzaldehyde | 2-Aminophenol-5-sulfonic acid | reddish blue (601) |
| 25 | 2-Hydrazino-4-(2-sulfato-ethylsulfonyl)-benzene-sulfonic acid | Benzaldehyde | 6-Sulfo-2-amino-phenol-4-sulfonamide | greenish blue |
| 26 | 2-Hydrazino-4-(2-sulfato-ethylsulfonyl)-benzene-sulfonic acid | Benzaldehyde | 2-Aminophenol-3,5-disulfonic acid | bluish green (638) |
| 27 | 2-Hydrazino-4-(2-sulfato-ethylsulfonyl)-benzene-sulfonic acid | Benzaldehyde | 2-Aminophenol-4-dimethyl-sulfon-amide | reddish blue |
| 28 | 2-Hydrazino-4-(2-sulfato-ethylsulfonyl)-benzene-sulfonic acid | Benzaldehyde | 6-Nitro-2-amino phenol-4-sulfonic acid | greenish blue (605) |
| 29 | 2-Hydrazino-4-(2-sulfato-ethylsulfonyl)-benzene-sulfonic acid | Benzaldehyde | 6-Methyl-2-amino-phenol-4-sulfonic acid | reddish blue |
| 30 | 2-Hydrazino-4-(2-sulfato-ethylsulfonyl)-benzene-sulfonic acid | Benzaldehyde | 6-Carboxy-2-amino-phenol-4-sulfonic acid | reddish blue |
| 31 | 2-Hydrazino-4-(2-sulfato-ethylsulfonyl)-benzene-sulfonic acid | Benzaldehyde | 4-Chloro-2-amino-phenol-6-sulfonic acid | reddish blue |
| 32 | 2-Hydrazino-4-(2-sulfato-ethylsulfonyl)-benzene-sulfonic acid | Benzaldehyde | 1-Amino-2-naphthol-4,6-disulfonic acid | bluish green (643) |
| 33 | 2-Hydrazino-4-(2-sulfato-ethylsulfonyl)-benzene-sulfonic acid | Benzaldehyde | 2-Amino-1-naphthol-4-sulfonic acid | greenish blue |
| 34 | 2-Hydrazino-4-(2-sulfato-ethylsulfonyl)-benzene-sulfonic acid | Benzaldehyde | 4-Acetamino-2-aminophenol-6-sulfonic acid | reddish blue |
| 35 | 2-Hydrazino-4-(2-sulfato-ethylsulfonyl)-benzene-sulfonic acid | Benzaldehyde | 4-Methyl-2-amino-phenol-6-sulfonic acid | reddish blue |
| 36 | 2-Hydrazino-4-(2-sulfato-ethylsulfonyl)-benzene-sulfonic acid | Benzaldehyde | 4-(2-Phosphato-ethylsulfonyl)-2-aminophenol | reddish blue |
| 37 | 2-Hydrazino-4-(2-sulfato-ethylsulfonyl)-benzene-sulfonic acid | Benzaldehyde | 5-(N—2-Sulfato-ethylsulfonyl-N—methylamino)-2-aminophenol | greenish blue |
| 38 | 2-Hydrazino-4-(2-sulfato-ethylsulfonyl)-benzene-sulfonic acid | Benzaldehyde | 4-(2-Thiosulfato-ethylsulfonyl)-2-aminophenol-6-sulfonic acid | greenish blue (606) |
| 39 | 2-Hydrazino-4-(2-sulfato-ethylsulfonyl)-benzene-sulfonic acid | Benzaldehyde | 4-(2-Sulfato-ethylsulfonyl)-6-nitro-2-amino-phenol | bluish green |
| 40 | 2-Hydrazino-4-(2-sulfato-ethylsulfonyl)-benzene-sulfonic acid | Benzaldehyde | 4-(2-Sulfatoethyl-sulfonyl)-6-methyl-2-aminophenol | reddish blue |
| 41 | 2-Hydrazino-4-(2-sulfato-ethylsulfonyl)-benzene-sulfonic acid | Benzaldehyde | 4-(2-Sulfatoethyl-sulfonyl)-6-chloro-2-aminophenol | reddish blue |
| 42 | 2-Hydrazino-4-(2-sulfato-ethylsulfonyl)-benzene-sulfonic acid | Benzaldehyde | 4-Ethylsulfonyl-2-aminophenol | reddish blue |
| 43 | 2-Hydrazino-4-(2-sulfato-ethylsulfonyl)-benzene-sulfonic acid | Benzaldehyde | 4-Ethylsulfonyl-2-aminophenol-6-sulfonic acid | reddish blue |
| 44 | 2-Hydrazino-4-(2-sulfato-ethylsulfonyl)-benzene-sulfonic acid | Benzaldehyde | 4-Vinylsulfonyl-2-aminophenol-6-sulfonic acid | greenish blue |
| 45 | 2-Hydrazino-4-(2-sulfato-ethylsulfonyl)-benzene-sulfonic acid | 4-Chloro-benzaldehyde | 2-aminophenol-4-sulfonic acid | reddish blue |
| 46 | 2-Hydrazino-4-(2-sulfato-ethylsulfonyl)-benzene-sulfonic acid | 4-Chloro-benzaldehyde | 2-Aminophenol-5-sulfonic acid | reddish blue |
| 47 | 2-Hydrazino-4-(2-sulfato-ethylsulfonyl)-benzene-sulfonic acid | 4-Chloro-benzaldehyde | 2-Aminophenol-4,6-disulfonic acid | greenish blue |

-continued

| | Compounds of the general formula (1) from: | | | Hue on cellulose |
|---|---|---|---|---|
| Example | Hydrazine component (8) | Aldehyde component (9) | Aminophenol (7) | ($\lambda_{max}$) |
| 48 | 2-Hydrazino-4-(2-sulfatoethylsulfonyl)-benzenesulfonic acid | Benzaldehyde-3-sulfonic acid | 4-Chloro-2-aminophenol | greenish blue |
| 49 | 2-Hydrazino-4-(2-sulfatoethylsulfonyl)-benzenesulfonic acid | 4-Chlorobenzaldehyde | 6-Chloro-2-aminophenol-4-sulfonic acid | reddish blue |
| 50 | 2-Hydrazino-4-(2-sulfatoethylsulfonyl)-benzenesulfonic acid | 4-Chlorobenzaldehyde | 6-Methyl-2-aminophenol-4-sulfonic acid | reddish blue |
| 51 | 2-Hydrazino-4-(2-sulfatoethylsulfonyl)-benzenesulfonic acid | 4-Chlorobenzaldehyde | 6-Acetamino-2-aminophenol-4-sulfonic acid | reddish blue |
| 52 | 2-Hydrazino-4-(2-sulfatoethylsulfonyl)-benzenesulfonic acid | 4-Chlorobenzaldehyde | 4-(2-Sulfatoethylsulfonyl)-2-aminophenol | reddish blue |
| 53 | 2-Hydrazino-4-(2-sulfatoethylsulfonyl)-benzenesulfonic acid | 4-Chlorobenzaldehyde | 5-(2-Sulfatoethylsulfonyl)-2-aminophenol | reddish blue |
| 54 | 2-Hydrazino-4-(2-sulfatoethylsulfonyl)-benzenesulfonic acid | 4-Chlorobenzaldehyde | 4-(2-Sulfatoethylsulfonyl)-2-aminophenol-6-sulfonic acid | reddish blue |
| 55 | 2-Hydrazino-4-(2-sulfatoethylsulfonyl)-benzenesulfonic acid | 4-Chlorobenzaldehyde | 4-Ethylsulfonyl-2-aminophenol | reddish blue |
| 56 | 2-Hydrazino-4-(2-sulfatoethylsulfonyl)-benzenesulfonic acid | 4-Chlorobenzaldehyde | 4-Ethylsulfonyl-2-aminophenol-6-sulfonic acid | reddish blue |
| 57 | 2-Hydrazino-4-(2-sulfatoethylsulfonyl)-benzenesulfonic acid | Benzaldehyde-3-sulfonic acid | 4,6-Dinitro-2-aminophenol | bluish green |
| 58 | 2-Hydrazino-4-(2-sulfatoethylsulfonyl)-benzenesulfonic acid | 4-Methylbenzaldehyde | 2-Aminophenol-4-sulfonic acid | reddish blue |
| 59 | 2-Hydrazino-4-(2-sulfatoethylsulfonyl)-benzenesulfonic acid | 4-Methylbenzaldehyde | 2-Aminophenol-5-sulfonic acid | reddish blue |
| 60 | 2-Hydrazino-4-(2-sulfatoethylsulfonyl)-benzenesulfonic acid | 4-Methylbenzaldehyde | 2-Aminophenol-4,6-disulfonic acid | reddish blue |
| 61 | 2-Hydrazino-4-(2-sulfatoethylsulfonyl)-benzenesulfonic acid | 4-Methylbenzaldehyde | 6-Chloro-2-aminophenol-4-sulfonic acid | reddish blue |
| 62 | 2-Hydrazino-4-(2-sulfatoethylsulfonyl)-benzenesulfonic acid | 4-Methylbenzaldehyde | 6-Methyl-2-aminophenol-4-sulfonic acid | reddish blue |
| 63 | 2-Hydrazino-4-(2-sulfatoethylsulfonyl)-benzenesulfonic acid | 4-Methylbenzaldehyde | 6-Acetamino-2-aminophenol-4-sulfonic acid | reddish blue |
| 64 | 2-Hydrazino-4-(2-sulfatoethylsulfonyl)-benzenesulfonic acid | 4-Methylbenzaldehyde | 4-(2-Sulfatoethylsulfonyl)-2-aminophenol | reddish blue |
| 65 | 2-Hydrazino-4-(2-sulfatoethylsulfonyl)-benzenesulfonic acid | 4-Methylbenzaldehyde | 5-(2-Sulfatoethylsulfonyl)-2-aminophenol | reddish blue |
| 66 | 2-Hydrazino-4-(2-sulfatoethylsulfonyl)-benzenesulfonic acid | 4-Methylbenzaldehyde | 4-(2-Sulfatoethylsulfonyl)-2-aminophenol-6-sulfonic acid | reddish blue |
| 67 | 2-Hydrazino-4-(2-sulfatoethylsulfonyl)-benzenesulfonic acid | 4-Methylbenzaldehyde | 4-Ethylsulfonyl-2-aminophenol | reddish blue |
| 68 | 2-Hydrazino-4-(2-sulfatoethylsulfonyl)-benzenesulfonic acid | 4-Methylbenzaldehyde | 4-Ethylsulfonyl-2-aminophenol-6-sulfonic acid | reddish blue |
| 69 | 2-Hydrazino-4-(2-sulfatoethylsulfonyl)-benzenesulfonic acid | Benzaldehyde-4-sulfonic acid | 4-(2-Sulfatoethylsulfonyl)-2-aminophenol | reddish blue (585) |
| 70 | 2-Hydrazino-4-(2-sulfatoethylsulfonyl)-benzenesulfonic acid | Benzaldehyde-3-sulfonic acid | 4-(2-Sulfatoethylsulfonyl)-2-aminophenol | reddish blue |
| 71 | 2-Hydrazino-4-(2-sulfatoethylsulfonyl)-benzenesulfonic acid | Benzaldehyde-2-sulfonic acid | 4-(2-Sulfatoethylsulfonyl)-2-aminophenol | reddish blue (571) |
| 72 | 2-Hydrazino-4-(2-sulfatoethylsulfonyl)-benzenesulfonic acid | Benzaldehyde-2,4-disulfonic acid | 4-(2-Sulfatoethylsulfonyl)-2-aminophenol | reddish blue |
| 73 | 2-Hydrazino-4-(2-sulfato- | 4-Methylbenzaldehyde- | 4-(2-Sulfato- | reddish blue |

-continued

Compounds of the general formula (1) from:

| Example | Hydrazine component (8) | Aldehyde component (9) | Aminophenol (7) | Hue on cellulose ($\lambda_{max}$) |
|---|---|---|---|---|
| | ethylsulfonyl)-benzene-sulfonic acid | 3-sulfonic acid | ethylsulfonyl)-2-aminophenol | |
| 74 | 2-Hydrazino-4-(2-sulfato-ethylsulfonyl)-benzene-sulfonic acid | 2-Chlorobenzaldehyde-3-sulfonic acid | 4-(2-Sulfato-ethylsulfonyl)-2-aminophenol | reddish blue |
| 75 | 2-Hydrazino-4-(2-sulfato-ethylsulfonyl)-benzene-sulfonic acid | 3-Chlorobenzaldehyde | 4-(2-Sulfato-ethylsulfonyl)-2-aminophenol | reddish blue |
| 76 | 2-Hydrazino-4-(2-sulfato-ethylsulfonyl)-benzene-sulfonic acid | 4-Chlorobenzaldehyde-2-sulfonic acid | 4-(2-Sulfato-ethylsulfonyl)-2-aminophenol | reddish blue |
| 77 | 2-Hydrazino-4-(2-sulfato-ethylsulfonyl)-benzene-sulfonic acid | 4-Carboxybenzaldehyde | 4-(2-Sulfato-ethylsulfonyl)-2-aminophenol | reddish blue |
| 78 | 2-Hydrazino-4-(2-sulfato-ethylsulfonyl)-benzene-sulfonic acid | 3-Methoxybenzaldehyde | 4-(2-Sulfato-ethylsulfonyl)-2-aminophenol | reddish blue |
| 79 | 2-Hydrazino-4-(2-sulfato-ethylsulfonyl)-benzene-sulfonic acid | 2-Methoxybenzaldehyde | 4-(2-Sulfato-ethylsulfonyl)-2-aminophenol | reddish blue |
| 80 | 2-Hydrazino-4-(2-sulfato-ethylsulfonyl)-benzene-sulfonic acid | 4-Methoxybenzaldehyde | 4-(2-Sulfato-ethylsulfonyl)-2-aminophenol | reddish blue |
| 81 | 2-Hydrazino-4-(2-sulfato-ethylsulfonyl)-benzene-sulfonic acid | 3-Methoxybenzaldehyde | 4-(2-Sulfato-ethylsulfonyl)-2-aminophenol | reddish blue |
| 82 | 2-Hydrazino-4-(2-sulfato-ethylsulfonyl)-benzene-sulfonic acid | 2-Methoxybenzaldehyde | 4-(2-Sulfato-ethylsulfonyl)-2-aminophenol | reddish blue |
| 83 | 2-Hydrazino-4-(2-sulfato-ethylsulfonyl)-benzene-sulfonic acid | 2-Chlorobenzaldehyde | 4-(2-Sulfato-ethylsulfonyl)-2-aminophenol | reddish blue |
| 84 | 2-Hydrazino-4-(2-sulfato-ethylsulfonyl)-benzene-sulfonic acid | 2-Hydroxybenzaldehyde | 4-(2-Sulfato-ethylsulfonyl)-2-aminophenol | reddish blue |
| 85 | 2-Hydrazino-4-(2-sulfato-ethylsulfonyl)-benzene-sulfonic acid | Benzaldehyde-3-sulfonic acid | 4-Ethylsulfonyl-2-aminophenol | greenish blue |
| 86 | 2-Hydrazino-4-(2-sulfato-ethylsulfonyl)-benzene-sulfonic acid | Benzaldehyde-3-sulfonic acid | 4-Ethylsulfonyl-2-aminophenol-6-sulfonic acid | greenish blue |
| 87 | 2-Hydrazino-4-(2-sulfato-ethylsulfonyl)-benzene-sulfonic acid | Benzaldehyde-3-sulfonic acid | 6-Acetamino-2-aminophenol-4-sulfonic acid | greenish blue |
| 88 | 2-Hydrazino-4-(2-sulfato-ethylsulfonyl)-benzene-sulfonic acid | Benzaldehyde-3-sulfonic acid | 6-Methyl-2-aminophenol-4-sulfonic acid | greenish blue |
| 89 | 2-Hydrazino-4-(2-sulfato-ethylsulfonyl)-benzene-sulfonic acid | Benzaldehyde-3-sulfonic acid | 5-(2-Sulfato-ethylsulfonyl)-2-aminophenol | greenish blue (602) |
| 90 | 2-Hydrazino-4-(2-sulfato-ethylsulfonyl)-benzene-sulfonic acid | Benzaldehyde-4-sulfonic acid | 5-(2-Sulfato-ethylsulfonyl)-2-aminophenol | reddish blue |
| 91 | 2-Hydrazino-4-(2-sulfato-ethylsulfonyl)-benzene-sulfonic acid | Benzaldehyde-2-sulfonic acid | 5-(2-Sulfato-ethylsulfonyl)-2-aminophenol | reddish blue (585) |
| 92 | 2-Hydrazino-4-(2-sulfato-ethylsulfonyl)-benzene-sulfonic acid | Benzaldehyde-4-sulfonic acid | 4-Methylsulfonyl-2-aminophenol | reddish blue |
| 93 | 2-Hydrazino-4-(2-sulfato-ethylsulfonyl)-benzene-sulfonic acid | Benzaldehyde-4-sulfonic acid | 4-Methylsulfonyl-2-aminophenol-6-sulfonic acid | reddish blue |
| 94 | 2-Hydrazino-4-(2-sulfato-ethylsulfonyl)-benzene-sulfonic acid | Benzaldehyde-4-sulfonic acid | 4-Acetamino-2-aminophenol-6-sulfonic acid | reddish blue |
| 95 | 2-Hydrazino-4-(2-sulfato-ethylsulfonyl)-benzene-sulfonic acid | Benzaldehyde-4-sulfonic acid | 6-Methyl-2-aminophenol-4-sulfonic acid | reddish blue |
| 96 | 2-Hydrazino-4-(2-sulfato-ethylsulfonyl)-benzene-sulfonic acid | Benzaldehyde-4-sulfonic acid | 4-(2-Sulfato-ethylsulfonyl)-2-aminophenol-6-sulfonic acid | reddish blue |
| 97 | 2-Hydrazino-4-(2-sulfato-ethylsulfonyl)-benzene-sulfonic acid | 2-Methoxybenzaldehyde | 4-(2-Sulfato-ethylsulfonyl)-2-aminophenol-6-sulfonic acid | reddish blue |
| 98 | 2-Hydrazino-4-(2-sulfato-ethylsulfonyl)-benzene- | Benzaldehyde-3-sulfonic acid | 4-(2-Sulfato-ethylsulfonyl)- | greenish blue |

-continued

| | Compounds of the general formula (1) from: | | | Hue on cellulose |
|---|---|---|---|---|
| Example | Hydrazine component (8) | Aldehyde component (9) | Aminophenol (7) | ($\lambda_{max}$) |
| | sulfonic acid | | 2-aminophenol-6-sulfonic acid | |
| 99 | 2-Hydrazino-4-(2-sulfato-ethylsulfonyl)-benzene-sulfonic acid | 3-Methoxybenzaldehyde | 4-(2-Sulfato-ethylsulfonyl)-2-aminophenol-6-sulfonic acid | greenish blue |
| 100 | 2-Hydrazino-4-(2-sulfato-ethylsulfonyl)-benzene-sulfonic acid | 4-Methoxybenzaldehyde | 4-(2-Sulfato-ethylsulfonyl)-2-aminophenol-6-sulfonic acid | reddish blue |
| 101 | 2-Hydrazino-4-(2-sulfato-ethylsulfonyl)-benzene-sulfonic acid | 4-Methoxy-3-chloro-benzaldehyde | 4-(2-Sulfato-ethylsulfonyl)-2-aminophenol-6-sulfonic acid | greenish blue |
| 102 | 2-Hydrazino-4-(2-sulfato-ethylsulfonyl)-benzene-sulfonic acid | 3-Methylbenzaldehyde | 4-(2-Sulfato-ethylsulfonyl)-2-aminophenol-6-sulfonic acid | greenish blue |
| 103 | 2-Hydrazino-4-(2-sulfato-ethylsulfonyl)-benzene-sulfonic acid | 2-Methylbenzaldehyde | 4-(2-Sulfato-ethylsulfonyl)-2-aminophenol-6-sulfonic acid | reddish blue |
| 104 | 2-Hydrazino-4-(2-sulfato-ethylsulfonyl)-benzene-sulfonic acid | 2,4-Dichlorobenzyldehyde | 4-(2-Sulfato-ethylsulfonyl)-2-aminophenol-6-sulfonic acid | reddish blue |
| 105 | 2-Hydrazino-4-(2-sulfato-ethylsulfonyl)-benzene-sulfonic acid | 2-Chlorobenzaldehyde | 4-(2-Sulfato-ethylsulfonyl)-2-aminophenol-6-sulfonic acid | reddish blue |
| 106 | 2-Hydrazino-4-(2-sulfato-ethylsulfonyl)-benzene-sulfonic acid | 3-Chlorobenzaldehyde | 4-(2-Sulfato-ethylsulfonyl)-2-aminophenol-6-sulfonic acid | reddish blue |
| 107 | 2-Hydrazino-4-(2-sulfato-ethylsulfonyl)-benzene-sulfonic acid | 2-Hydroxybenzaldehyde | 4-(2-Sulfato-ethylsulfonyl)-2-aminophenol-6-sulfonic acid | greenish blue |
| 108 | 2-Hydrazino-4-(2-sulfato-ethylsulfonyl)-benzene-sulfonic acid | 3-Hydroxybenzaldehyde | 4-(2-Sulfato-ethylsulfonyl)-2-aminophenol-6-sulfonic acid | greenish blue |
| 109 | 2-Hydrazino-4-(2-sulfato-ethylsulfonyl)-benzene-sulfonic acid | Benzaldehyde-4-sulfonic acid | 4,6-Dichloro-2-aminophenol | reddish blue |
| 110 | 2-Hydrazino-4-(2-sulfato-ethylsulfonyl)-benzene-sulfonic acid | 4-Hydroxybenzaldehyde | 4-(2-Sulfato-ethylsulfonyl)-2-aminophenol-6-sulfonic acid | greenish blue |
| 111 | 2-Hydrazino-4-(2-sulfato-ethylsulfonyl)-benzene-sulfonic acid | 4-(2-Sulfatoethyl-sulfonyl)-benzaldehyde | 4-(2-Sulfato-ethylsulfonyl)-2-aminophenol-6-sulfonic acid | reddish blue |
| 112 | 2-Hydrazino-4-(2-sulfato-ethylsulfonyl)-benzene-sulfonic acid | 1-Naphthaldehyde | 4-(2-Sulfato-ethylsulfonyl)-2-aminophenol-6-sulfonic acid | greenish blue |
| 113 | 2-Hydrazino-4-(2-sulfato-ethylsulfonyl)-benzene-sulfonic acid | 2-Naphthaldehyde | 4-(2-Sulfato-ethylsulfonyl-)2-aminophenol-6-sulfonic acid | greenish blue |
| 114 | 2-Hydrazino-4-(2-sulfato-ethylsulfonyl)-benzene-sulfonic acid | Furan-2-aldehyde | 4-(2-Sulfato-ethylsulfonyl-)2-aminophenol-6-sulfonic acid | reddish blue |
| 115 | 2-Hydrazino-4-(2-sulfato-ethylsulfonyl)-benzene-sulfonic acid | Benzaldehyde-4-sulfonic acid | 2-Aminophenol-4-sulfonic acid | reddish blue (589) |
| 116 | 2-Hydrazino-4-(2-sulfato-ethylsulfonyl)-benzene-sulfonic acid | Benzaldehyde-3-sulfonic acid | 2-Aminophenol-4-sulfonic acid | greenish blue |
| 117 | 2-Hydrazino-4-(2-sulfato-ethylsulfonyl)-benzene-sulfonic acid | 4-Methylbenzaldehyde-3-sulfonic acid | 2-Aminophenol-4-sulfonic acid | greenish blue |
| 118 | 2-Hydrazino-4-(2-sulfato-ethylsulfonyl)-benzene-sulfonic acid | 2-Chlorobenzaldehyde-3-sulfonic acid | 2-Aminophenol-4-sulfonic acid | reddish blue |
| 119 | 2-Hydrazino-4-(2-sulfato- | 3-Methoxybenzaldehyde | 2-Aminophenol- | reddish blue |

-continued

| | Compounds of the general formula (1) from: | | | Hue on cellulose ($\lambda_{max}$) |
|---|---|---|---|---|
| Example | Hydrazine component (8) | Aldehyde component (9) | Aminophenol (7) | |
| | ethylsulfonyl)-benzene-sulfonic acid | | 4-sulfonic acid | |
| 120 | 2-Hydrazino-4-(2-sulfato-ethylsulfonyl)-benzene-sulfonic acid | 4-Methoxybenzaldehyde | 2-Aminophenol-4-sulfonic acid | greenish blue |
| 121 | 2-Hydrazino-4-(2-sulfato-ethylsulfonyl)-benzene-sulfonic acid | 3-Methoxybenzaldehyde | 2-Aminophenol-4-sulfonic acid | greenish blue |
| 122 | 2-Hydrazino-4-(2-sulfato-ethylsulfonyl)-benzene-sulfonic acid | 2-Methoxybenzaldehyde | 2-Aminophenol-4-sulfonic acid | reddish blue |
| 123 | 2-Hydrazino-4-(2-sulfato-ethylsulfonyl)-benzene-sulfonic acid | 4-(2-Sulfatoethyl-sulfonyl)-benzaldehyde | 2-Aminophenol-4-sulfonic acid | reddish blue (584) |
| 124 | 2-Hydrazino-4-(2-sulfato-ethylsulfonyl)-benzene-sulfonic acid | Benzaldehyde-4-sulfonic acid | 6-Chloro-2-amino-phenol-4-sulfonic acid | reddish blue |
| 125 | 2-Hydrazino-4-(2-sulfato-ethylsulfonyl)-benzene-sulfonic acid | Benzaldehyde-3-sulfonic acid | 6-Chloro-2-amino-phenol-4-sulfonic acid | greenish blue |
| 126 | 2-Hydrazino-4-(2-sulfato-ethylsulfonyl)-benzene-sulfonic acid | Bezaldehyde-4-sulfonic acid | 2-Aminophenol-4,6-disulfonic acid | reddish blue |
| 127 | 2-Hydrazino-4-(2-sulfato-ethylsulfonyl)-benzene-sulfonic acid | Benzaldehyde-3-sulfonic acid | 2-Aminophenol-4,6-disulfonic acid | greenish blue |
| 128 | 2-Hydrazino-4-(2-sulfato-ethylsulfonyl)-benzene-sulfonic acid | 3-Methoxybenzaldehyde | 2-Aminophenol-4,6-disulfonic acid | greenish blue |
| 129 | 2-Hydrazino-4-(2-sulfato-ethylsulfonyl)-benzene-sulfonic acid | 2-Methoxybenzaldehyde | 2-Aminophenol-4,6-disulfonic acid | reddish blue |
| 130 | 2-Hydrazino-4-(2-sulfato-ethylsulfonyl)-benzene-sulfonic acid | 2-Methylbenzaldehyde | 2-Aminophenol-4,6-disulfonic acid | reddish blue |
| 131 | 2-Hydrazino-4-(2-sulfato-ethylsulfonyl)-benzene-sulfonic acid | 4-(2-Sulfatoethyl-sulfonyl)-benzaldehyde | 2-Aminophenol-4,6-disulfonic acid | reddish blue (593) |
| 132 | 2-Hydrazino-4-(2-sulfato-ethylsulfonyl)-benzene-1,5-disulfonic acid | Benzaldehyde | 4-(2-Sulfato-ethylsulfonyl)-2-aminophenol | greenish blue |
| 133 | 2-Hydrazino-4-(2-sulfato-ethylsulfonyl)-benzene-1,5-disulfonic acid | Benzaldehyde | 2-Aminophenol-4-sulfonic acid | greenish blue |
| 134 | 2-Hydrazino-4-(2-sulfato-ethylsulfonyl)-benzene-1,5-disulfonic acid | Benzaldehyde | 5-(2-Sulfato-ethylsulfonyl)-2-aminophenol | greenish blue |
| 135 | 2-Hydrazino-5-(2-sulfato-ethylsulfonyl)-benzene-sulfonic acid | Benzaldehyde | 2-Aminophenol-4-sulfonic acid | greenish blue (601) |
| 136 | 2-Hydrazino-5-(2-sulfato-ethylsulfonyl)-benzene-sulfonic acid | Benzaldehyde | 2-Aminophenol-5-sulfonic acid | greenish blue |
| 137 | 2-Hydrazino-5-(2-sulfato-ethylsulfonyl)-benzene-sulfonic acid | Benzaldehyde | 2-Aminophenol-4,6-disulfonic acid | greenish blue (610) |
| 138 | 2-Hydrazino-5-(2-sulfato-ethylsulfonyl)-benzene-sulfonic acid | Benzaldehyde | 6-Nitro-2-amino-phenol-4-sulfonic acid | greenish blue (613) |
| 139 | 2-Hydrazino-5-(2-sulfato-ethylsulfonyl)-benzene-sulfonic acid | Benzaldehyde | 6-Chloro-2-amino-phenol-4-sulfonic acid | reddish blue (604) |
| 140 | 2-Hydrazino-5-(2-sulfato-ethylsulfonyl)-benzene-sulfonic acid | Benzaldehyde | 6-Acetamino-2-aminophenol-4-sulfonic acid | reddish blue (605) |
| 141 | 2-Hydrazino-5-(2-sulfato-ethylsulfonyl)-benzene-sulfonic acid | Benzaldehyde | 6-Methyl-2-amino-phenol-4-sulfonic acid | reddish blue |
| 142 | 2-Hydrazino-5-(2-sulfato-ethylsulfonyl)-benzene-sulfonic acid | Benzaldehyde | 4-(2-Sulfato-ethylsulfonyl)-2-aminophenol | reddish blue (597) |
| 143 | 2-Hydrazino-5-(2-sulfato-ethylsulfonyl)-benzene-sulfonic acid | Benzaldehyde | 5-(2-Sulfato-ethylsulfonyl)-2-aminophenol | reddish blue (616) |
| 144 | 2-Hydrazino-5-(2-sulfato-ethylsulfonyl)-benzene-sulfonic acid | Benzaldehyde | 4-(2-Thiosulfato-ethylsulfonyl)-2-aminophenol-6-sulfonic acid | greenish blue (606) |

-continued

Compounds of the general formula (1) from:

| Example | Hydrazine component (8) | Aldehyde component (9) | Aminophenol (7) | Hue on cellulose ($\lambda_{max}$) |
|---|---|---|---|---|
| 145 | 2-Hydrazino-5-(2-sulfato-ethylsulfonyl)-benzene-sulfonic acid | Benzaldehyde | 4-Ethylsulfonyl-2-aminophenol | reddish blue |
| 146 | 2-Hydrazino-5-(2-sulfato-ethylsulfonyl)-benzene-sulfonic acid | Benzaldehyde | 4-Ethylsulfonyl-2-aminophenol-6-sulfonic acid | greenish blue |
| 147 | 2-Hydrazino-5-(2-sulfato-ethylsulfonyl)-benzene-sulfonic acid | Benzaldehyde | 2-Aminophenol-4-sulfonamide | reddish blue |
| 148 | 2-Hydrazino-5-(2-sulfato-ethylsulfonyl)-benzene-sulfonic acid | Benzaldehyde-4-sulfonic acid | 4-(2-Sulfato-ethylsulfonyl)-2-aminophenol | reddish blue (585) |
| 149 | 2-Hydrazino-5-(2-sulfato-ethylsulfonyl)-benzene-sulfonic acid | Benzaldehyde | 2-Aminophenol-4-sulfonic acid dimethylamide | reddish blue |
| 150 | 2-Hydrazino-5-(2-sulfato-ethylsulfonyl)-benzene-sulfonic acid | Benzaldehyde | 4-Vinylsulfonyl-2-aminophenol-6-sulfonic acid | greenish blue (606) |
| 151 | 2-Hydrazino-5-(2-sulfato-ethylsulfonyl)-benzene-sulfonic acid | Benzaldehyde-4-sulfonic acid | 5-(2-Sulfato-ethylsulfonyl)-2-aminophenol | reddish blue |
| 152 | 2-Hydrazino-5-(2-sulfato-ethylsulfonyl)-benzene-sulfonic acid | Benzaldehyde-4-sulfonic acid | 4-(2-Sulfato-ethylsulfonyl)-2-aminophenol-6-sulfonic acid | reddish blue |
| 153 | 2-Hydrazino-5-(2-sulfato-ethylsulfonyl)-benzene-sulfonic acid | Benzaldehyde-4-sulfonic acid | 2-Aminophenol-4-sulfonic acid | reddish blue (589) |
| 154 | 2-Hydrazino-5-(2-sulfato-ethylsulfonyl)-benzene-sulfonic acid | Benzaldehyde-4-sulfonic acid | 2-Aminophenol-4,6-disulfonic acid | reddish blue |
| 155 | 2-Hydrazino-5-(2-sulfato-ethylsulfonyl)-benzene-sulfonic acid | Benzaldehyde-4-sulfonic acid | 2-Aminophenol-4-ethylsulfone | reddish blue |
| 156 | 2-Hydrazino-5-(2-sulfato-ethylsulfonyl)-benzene-sulfonic acid | Benzaldehyde-4-sulfonic acid | 2-Aminophenol-4-ethylsulfone-6-sulfonic acid | reddish blue |
| 157 | 2-Hydrazino-5-(2-sulfato-ethylsulfonyl)-benzene-sulfonic acid | Benzaldehyde-4-sulfonic acid | 6-Chloro-2-aminophenol-4-sulfonic acid | reddish blue |
| 158 | 2-Hydrazino-5-(2-sulfato-ethylsulfonyl)-benzene-sulfonic acid | Benzaldehyde-4-sulfonic acid | 6-Acetylamino-2-aminophenol-4-sulfonic acid | reddish blue |
| 159 | 2-Hydrazino-5-(2-sulfato-ethylsulfonyl)-benzene-sulfonic acid | Benzaldehyde-4-sulfonic acid | 2-Aminophenol-4-sulfonamide | reddish blue |
| 160 | 2-Hydrazino-5-(2-sulfato-ethylsulfonyl)-benzene-sulfonic acid | Benzaldehyde-4-sulfonic acid | 2-Aminophenol-4-dimethylsulfonamide | reddish blue |
| 161 | 2-Hydrazino-5-(2-sulfato-ethylsulfonyl)-benzene-sulfonic acid | Benzaldehyde-2-sulfonic acid | 4-(2-Sulfato-ethylsulfonyl)-2-aminophenol | reddish blue |
| 162 | 2-Hydrazino-5-(2-sulfato-ethylsulfonyl)-benzene-sulfonic acid | Benzaldehyde-2-sulfonic acid | 5-(2-Sulfato-ethylsulfonyl)-2-aminophenol | reddish blue |
| 163 | 2-Hydrazino-5-(2-sulfato-ethylsulfonyl)-benzene-sulfonic acid | Benzaldehyde-2-sulfonic acid | 2-Aminophenol-4-sulfonic acid | reddish blue |
| 164 | 2-Hydrazino-5-(2-sulfato-ethylsulfonyl)-benzene-sulfonic acid | Benzaldehyde-2-sulfonic acid | 2-Aminophenol-4,6-disulfonic acid | reddish blue |
| 165 | 2-Hydrazino-5-(2-sulfato-ethylsulfonyl)-benzene-sulfonic acid | Benzaldehyde-2-sulfonic acid | 6-Chloro-2-aminophenol-4-sulfonic acid | reddish blue |
| 166 | 2-Hydrazino-5-(2-sulfato-ethylsulfonyl)-benzene-sulfonic acid | Benzaldehyde-3-sulfonic acid | 4-(2-Sulfato-ethylsulfonyl)-2-aminophenol-6-sulfonic acid | greenish blue |
| 167 | 2-Hydrazino-5-(2-sulfato-ethylsulfonyl)-benzene-sulfonic acid | Benzaldehyde-3-sulfonic acid | 2-Aminophenol-4-sulfonic acid | greenish blue |
| 168 | 2-Hydrazino-5-(2-sulfato-ethylsulfonyl)-benzene-sulfonic acid | Benzaldehyde-3-sulfonic acid | 2-Aminophenol-4,6-disulfonic acid | greenish blue |
| 169 | 2-Hydrazino-5-(2-sulfato-ethylsulfonyl)-benzene-sulfonic acid | Benzaldehyde-3-sulfonic acid | 2-amino-1-hydroxyphenyl 4-ethyl sulfone | greenish blue |
| 170 | 2-Hydrazino-5-(2-sulfato- | Benzaldehyde-3- | 6-Sulfo-2-amino- | greenish |

-continued

| | Compounds of the general formula (1) from: | | | Hue on cellulose ($\lambda_{max}$) |
|---|---|---|---|---|
| Example | Hydrazine component (8) | Aldehyde component (9) | Aminophenol (7) | |
| | ethylsulfonyl)-benzene-sulfonic acid | sulfonic acid | 1-hydroxyphenyl-4-ethyl sulfone | blue |
| 171 | 2-Hydrazino-5-(2-sulfato-ethylsulfonyl)-benzene-sulfonic acid | Benzaldehyde-3-sulfonic acid | 6-Acetylamino-2-aminophenol-4-sulfonic acid | greenish blue |
| 172 | 2-Hydrazino-5-(2-sulfato-ethylsulfonyl)-benzene-sulfonic acid | Benzaldehyde-3-sulfonic acid | 2-Aminophenol-5-sulfonamide | greenish blue |
| 173 | 2-Hydrazino-5-(2-sulfato-ethylsulfonyl)-benzene-sulfonic acid | Benzaldehyde-3-sulfonic acid | 2-Aminophenol-4-dimethyl-sulfonamide | greenish blue |
| 174 | 2-Hydrazino-5-(2-sulfato-ethylsulfonyl)-benzene-sulfonic acid | Benzaldehyde-3-sulfonic acid | 6-Chloro-2-aminophenol-4-sulfonic acid | greenish blue |
| 175 | 2-Hydrazino-5-(2-sulfato-ethylsulfonyl)-benzene-sulfonic acid | Benzaldehyde-2,4-sulfonic acid | 4-(2-Sulfato-ethylsulfonyl)-2-aminophenol | reddish blue |
| 176 | 2-Hydrazino-5-(2-sulfato-ethylsulfonyl)-benzene-sulfonic acid | 4-Methylbenzaldehyde | 4-(2-Sulfato-ethylsulfonyl)-2-aminophenol-6-sulfonic acid | greenish blue |
| 177 | 2-Hydrazino-5-(2-sulfato-ethylsulfonyl)-benzene-sulfonic acid | 4-Methylbenzaldehyde | 5-(2-Sulfato-ethylsulfonyl)-2-aminophenol | greenish blue |
| 178 | 2-Hydrazino-5-(2-sulfato-ethylsulfonyl)-benzene-sulfonic acid | 4-Methylbenzaldehyde | 2-Aminophenol-4-sulfonic acid | greenish blue |
| 179 | 2-Hydrazino-5-(2-sulfato-ethylsulfonyl)-benzene-sulfonic acid | 4-Methylbenzaldehyde | 2-Aminophenol-4,6-disulfonic acid | greenish blue |
| 180 | 2-Hydrazino-5-(2-sulfato-ethylsulfonyl)-benzene-sulfonic acid | 4-Methylbenzaldehyde | 6-Chloro-2-aminophenol-4-sulfonic acid | greenish blue |
| 181 | 2-Hydrazino-5-(2-sulfato-ethylsulfonyl)-benzene-sulfonic acid | 4-Methylbenzaldehyde | 2-Aminophenol-4-ethylsulfonyl-phenol-6-sulfonic acid | greenish blue |
| 182 | 2-Hydrazino-5-(2-sulfato-ethylsulfonyl)-benzene-sulfonic acid | 4-Chlorobenzaldehyde | 4-(2-Sulfato-ethylsulfonyl)-2-aminophenol | reddish blue |
| 183 | 2-Hydrazino-5-(2-sulfato-ethylsulfonyl)-benzene-sulfonic acid | 4-Chlorobenzaldehyde | 5-(2-Sulfato-ethylsulfonyl)-aminophenol | reddish blue |
| 184 | 2-Hydrazino-5-(2-sulfato-ethylsulfonyl)-benzene-sulfonic acid | 4-Chlorobenzaldehyde | 4-(2-Sulfato-ethylsulfonyl)-2-aminophenol-6-sulfonic acid | reddish blue |
| 185 | 2-Hydrazino-5-(2-sulfato-ethylsulfonyl)-benzene-sulfonic acid | 4-Chlorobenzaldehyde | 2-Aminophenol-4-sulfonic acid | reddish blue |
| 186 | 2-Hydrazino-5-(2-sulfato-ethylsulfonyl)-benzene-sulfonic acid | 4-Chlorobenzaldehyde | 2-Aminophenol-4,6-disulfonic acid | greenish blue |
| 187 | 2-Hydrazino-5-(2-sulfato-ethylsulfonyl)-benzene-sulfonic acid | 4-Chlorobenzaldehyde | 6-Chloro-2-aminophenol-4-sulfonic acid | greenish blue |
| 188 | 2-Hydrazino-5-(2-sulfato-ethylsulfonyl)-benzene-sulfonic acid | 4-Chlorobenzaldehyde | 2-Aminophenol-4-ethylsulfonyl-phenol-6-sulfonic acid | greenish blue |
| 189 | 2-Hydrazino-5-(2-sulfato-ethylsulfonyl)-benzene-sulfonic acid | Benzaldehyde-2-sulfonic acid | 2-Amino-4-ethyl-sulfonylphenol | reddish blue |
| 190 | 2-Hydrazino-5-(2-sulfato-ethylsulfonyl)-benzene-sulfonic acid | Benzaldehyde-3-sulfonic acid | 4-(2-Sulfato-ethylsulfonyl)-2-aminophenol | greenish blue |
| 191 | 2-Hydrazino-5-(2-sulfato-ethylsulfonyl)-benzene-sulfonic acid | Benzaldehyde-3-sulfonic acid | 5-(2-Sulfato-ethylsulfonyl)-2-aminophenol | greenish blue |
| 192 | 2-Hydrazino-4-(2-sulfato-ethylsulfonyl)-benzene-sulfonic acid | 2-Methoxybenzaldehyde | 2-Aminophenol-4-sulfonic acid | reddish blue |

EXAMPLE 193

(a) 281 parts of 2-amino-4-(2-hydroxyethylsulfonyl)-benzenesulfonic acid are diazotized as in Example 1a and are converted with neutral sodium sulfite/sodium bisulfite suspension into the hydrazinedisulfonate; 150 parts of 31% strength aqueous hydrochloric acid are added at 60° C., and the mixture is heated to 100° C. While water is simultaneously distilled off, the hydrazodisulfonate is hydrolyzed to 2-hydrazino-4-(2-hydroxyethylsulfonyl)-benzenesulfonic acid. Concentrating to a third of the original volume, then cooling and removal of the precipitated hydraxine by filtration, which is dried, are followed.

(b) 237 parts of 2-hydrazino-4-(2-hydroxyethylsulfonyl)benzenesulfonic acid are suspended in 1200 parts of water and dissolved with 140 parts of 33% strength aqueous sodium hydroxide solution at a pH of 6 and, after addition of 180 parts of 4-(2-hydroxyethylsulfonyl)-benzaldehyde, converted at a temperature of 60° C. to 2-(4-β-hydroxyethylsulfonylbenzylidenehydrazino)-4-(β-sulfatoethylsulfonyl)-benzenesulfonic acid, which is isolated by salting out with sodium chloride in the form of the sodium salt.

(c) 345 parts of the hydrazone prepared in section (b) are added to 1000 parts of sulfuric acid (monohydrate). To complete the esterification, the batch is then stirred for a further 10 hours and is then poured onto ice, and the ester compound is salted out with sodium chloride and filtered off with suction.

(d) To prepare a copper formazan compound according to the invention a procedure analogous to that of Example 1 (c) is followed, except that instead of using the aqueous hydrazone salt solution used there an aqueous solution of the hydrazone salt solution prepared in section (c) above is used, affording the compound according to the invention of the formula

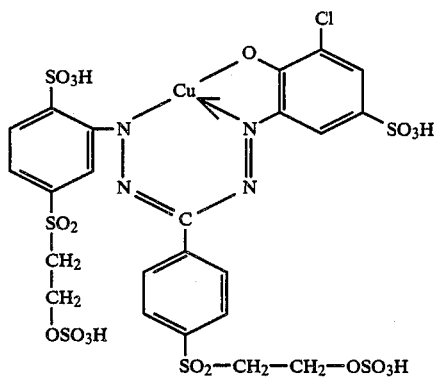

as its alkali metal salt (sodium salt) in the form of an electrolyte-containing powder.

This compound according to the invention ($\lambda_{max}$=586 nm in aqueous solution) likewise has very good dye properties and dyes for example cellulose fiber materials by the application and fixing methods customary in the art for fiber-reactive dyes in reddish blue shades having good fastness properties.

EXAMPLE 194

To prepare a compound according to the invention the procedure of Example 193 is followed, except that instead of using the diazonium salt used there the diazonium compound of 2-aminophenol-4-sulfonic acid is used in an equivalent amount, affording an alkali metal salt of a compound according to the invention of a general formula (1e)

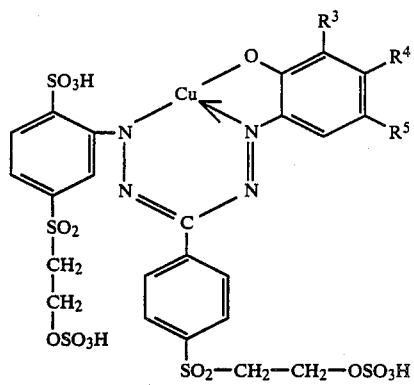

in which $R^3$ and $R^4$ both stand for a hydrogen atom and $R^5$ denotes a sulfo group. It gives a reddish blue solution in water ($\lambda_{max}$=584 nm) and is very highly suitable for use as a fiber-reactive dye. Applied by the application methods customary in the art it produces for example on cellulose fiber materials strong reddish blue dyeings and prints having good fastness properties.

EXAMPLE 195

To prepare a compound according to the invention the procedure of Example 193 is followed, except that instead of using the diazonium salt used there the diazonium compound of 2-aminophenol-4,6-disulfonic acid is used in an equivalent amount, affording an alkali metal salt of a compound according to the invention of the general formula (1e) indicated in Example 194, in which $R^4$ is a hydrogen atom and $R^3$ and $R^5$ both stand for a sulfo group. It has a $\lambda_{max}$ of 593 nm in water and is very highly suitable for use as a fiber-reactive dye. Applied by the application methods customary in the art it produces for example on cellulose fiber materials strong reddish blue dyeings and prints having good fastness properties.

EXAMPLE 196

To prepare a compound according to the invention the procedure of Example 193 is followed, except that instead of using the diazonium salt used there the diazonium compound of 6-acetylamino-2-aminophenol-4-sulfonic acid is used in an equivalent amount, affording an alkali metal salt of a compound according to the invention of the general formula (1e) given in Example 194, in which $R^3$ stands for an acetylamino group, $R^4$ stands for a hydrogen atom and $R^5$ stands for a sulfo group. It has a $\lambda_{max}$ of 592 nm in water and is very highly suitable for use as a fiber-reactive dye. Applied by the application methods customary in the art it produces for example on cellulose fiber materials strong reddish blue dyeings and prints having good fastness properties.

EXAMPLE 197

To prepare a compound according to the invention the procedure of Example 193 is followed, except that instead of using the diazonium salt used there the diazonium compound of 2-aminophenol-5-sulfonic acid is used in an equivalent amount, affording an alkali metal salt of a compound according to the invention of the general formula (1e) indicated in Example 194, in which $R^3$ and $R^5$ both denote a hydrogen atom and $R^4$ stands for a sulfo group. It has a $\lambda_{max}$ of 593 nm in water and is very highly suitable for use as a fiber-reactive dye.

Applied by the application methods customary in the art it produces for example on cellulose fiber materials strong reddish blue dyeings and prints having good fastness properties.

EXAMPLE 198

To prepare a compound according to the invention the procedure of Example 193 is followed, except that instead of using the diazonium salt used there the diazonium compound of 4-(2-sulfatoethylsulfonyl)-2-aminophenol-6-sulfonic acid is used in an equivalent amount, affording an alkali metal salt of a compound according to the invention of the general formula (1e) indicated in Example 194, in which $R^3$ denotes a sulfo group, $R^4$ is a hydrogen atom and $R^5$ stands for a $\beta$-sulfatoethylsulfonyl group. It has a $\lambda_{max}$ of 590 nm in water and is very highly suitable for use as a fiber-reactive dye. Applied by the application methods customary in the art it produces for example on cellulose fiber materials strong reddish blue dyeings and prints having good fastness properties.

APPLICATION EXAMPLE 1

To dye a cotton fabric, an aqueous dyebath is prepared to contain in solution in 2000 parts by volume 5 parts of the compound according to the invention of Example 1, 10 parts of anhydrous sodium sulfate, 10 parts of anhydrous sodium carbonate and 4 parts by volume of 32.5% strength aqueous sodium hydroxide solution. To this dyebath are added 100 parts of a cotton fabric which is dyed at a temperature of 50° C. for between 60 and 90 minutes. After soapoff and rinse in conventional manner the result obtained is a deep blue dyeing having the good end-use and manufacturing fastness properties indicated in the description.

APPLICATION EXAMPLE 2

To print a mercerized cotton fabric, use is made of a print paste which contains per 1000 parts 30 parts of the compound according to the invention of Example 1, 50 parts of urea, 375 parts of water, 500 parts of a neutral 4% strength aqueous alginate thickening, 15 parts of sodium bicarbonate and 10 parts of the sodium salt of m-nitrobenzoic acid. The cotton fabric is printed with this print paste in conventional manner and after drying is steamed with saturated steam at 101° to 103° C. for 10 to 15 minutes. After this fixing operation the fabric is finished in conventional manner by rinsing with cold and warm water, by soaping off at the boil and renewed rinsing with water and by subsequent drying. The result obtained is a deep blue print which possesses the good light and wet fastness properties mentioned in the description.

APPLICATION EXAMPLE 3

30 parts of the compound according to the invention of Example 4 are dissolved in 200 parts of water at 70° C.; the solution is stirred into 500 parts of a neutral or weakly acid aqueous 4% strength alginate thickening and is made up with water to 1000 parts. The print paste thus prepared is used to print a mercerized cotton fabric in conventional manner, the fabric being subsequently dried and, for fixation of the compound according to the invention, being passed through a hot aqueous fixing bath at 90° to 105° C. which is composed of 1000 parts of water, 1000 parts of sodium chloride, 1500 parts of anhydrous sodium carbonate, 500 parts of anhydrous potassium carbonate and 700 parts by volume of 33% strength aqueous sodium hydroxide solution. In the course of this operation, fixation occurs within a few seconds, so that the printed fabric can be passed through very rapidly. After this fixation treatment, the fabric is finished in conventional manner by rinsing with cold water, by hot washing, by renewed rinsing with water and by drying. The result obtained is a level blue print pattern having the good light and fastness properties mentioned in the description.

APPLICATION EXAMPLE 4

40 parts of the compound according to the invention of Example 1 are dissolved in 200 parts of water at 70° C.; the solution is stirred into 500 parts of a neutral or weakly acid aqueous 4% strength alginate thickening and is made up with water to 1000 parts. The print paste thus prepared is used to print a mercerized cotton fabric in conventional manner, the fabric being subsequently dried and, for fixation of the compound according to the invention, being padded with a padding liquor composed of 100 parts of sodium carbonate, 100 parts of sodium chloride, 100 parts of potassium carbonate, 100 parts by potassium carbonate, 100 parts by volume of 33% strength aqueous sodium hydroxide solution and 600 parts of water, at room temperature, using a liquor pickup of about 60 to 70% on weight of fiber. Fixation takes as little as 5 to 10 minutes of standing in air. After this fixing treatment, the fabric is finished in conventional manner by rinsing with cold water, by hot washing, by renewed rinsing with water and by drying. The result obtained is a level blue print pattern having good light and wet fastness properties.

APPLICATION EXAMPLE 5

To dye a cotton fabric, an aqueous padding liquor is prepared to contain, per liter, 40 g of the compound according to the invention of Example 1, 100 g of urea, 30 g of anhydrous sodium sulfate and 16 parts by volume of aqueous 32.5% strength sodium hydroxide solution. The cotton fabric is pad-mangled at room temperature using a liquor pickup of 80% on weight of fiber and is wound onto a beam, which is wrapped in plastic sheeting and left to stand at room temperature for 24 hours. The dye becomes fixed during this period. After soapoff and rinse in conventional manner the result obtained is a deep brilliant blue dyeing of the cotton fabric, which has the good end-use and manufacturing fastness properties mentioned in Example 1.

APPLICATION EXAMPLE 6

If one of the above-described procedures of the present invention is used for dyeing and printing cotton or nylon materials or cellulose fiber materials, for example analogously to the above application examples 1 to 6, and if the dye used therein is in accordance with the invention one of the copper formazan compounds of the invention described in the other preceding illustrative embodiments or tabled examples, the results obtained are likewise deep dyeings and prints having good fastness properties and the hues indicated for these dyes.

I claim:

1. A compound of the formula

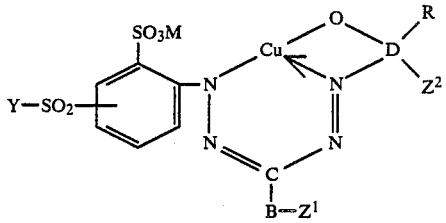

in which

Y is vinyl or a group of the formula

—CH$_2$—CH$_2$—E in which E is sulfato;

the group Y—SO$_2$— is bonded to the benzene ring in meta-position relative to the indicated group —SO$_3$M and in para-position relative to the nitrogen atom, or in para-position relative to the indicated group —SO$_3$M and in meta-position relative to the nitrogen atom;

M is hydrogen or an alkali metal;

B is phenylene unsubstituted or substituted by one or two substituents selected from the group consisting of hydroxy, halogen, alkyl of 1 to 5 carbon atoms, alkoxy of 1 to 4 carbon atoms and a group —SO$_2$—Y$^1$ in which Y$^1$ is vinyl or a group of the formula —CH$_2$—CH$_2$—E$^1$ in which E$^1$ is hydroxy, halogen, lower alkanoyloxy, phosphato, thiosulfato or sulfato;

Z$^1$ is hydrogen, or is a water-solubilizing group which is bonded once or twice to B, selected from carboxy and sulfo;

D is a benzene ring to which the oxygen atom and the nitrogen atom are bonded in ortho-position relative to each other and which is unsubstituted or substituted by one or two substituents selected from the group consisting of halogen, nitro, alkyl of 1 to 5 carbon atoms, alkoxy of 1 to 4 carbon atoms, alkylsulfonyl of 1 to 4 carbon atoms and alkanoylamino of 2 to 5 carbon atoms;

Z$^2$ is hydrogen or a water-solubilizing group which is bonded once or twice to D, selected from carboxy or sulfo;

R is hydrogen or a group of the formula

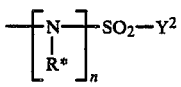

in which

R* is hydrogen or alkyl of 1 to 4 carbon atoms unsubstituted or substituted by a hydroxy, sulfato, sulfo or carboxy, n is zero or 1, and Y$^2$ is vinyl or a group of the formula

—CH$_2$—CH$_2$—E$^2$ in which E$^2$ is hydroxy, halogen, lower alkanoyloxy, phosphato, thiosulfato or sulfato.

2. A compound according to claim 1 wherein B is unsubstituted phenylene.

3. A compound according to claim 1, wherein R is hydrogen.

4. A compound according to claim 1, wherein R is a group

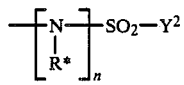

5. A compound according to claim 4, wherein n is zero.

6. A compound according to claim 1, wherein Z$^1$ is bonded once or twice to B and is one or two sulfo groups.

7. A compound according to claim 1, wherein Z$^2$ is bonded once or twice to D and is one or two sulfo groups.

8. A compound according to claim 1, wherein B is phenylene or phenylene substituted by 1 or 2 substituents selected from the group consisting of chlorine, methyl, methoxy, ethoxy, hydroxy, β-hydroxyethylsulfonyl and β-sulfatoethylsulfonyl and Z$^1$ is hydrogen or one or two sulfo groups or one sulfo and one carboxy group.

9. A compound according to claim 1, wherein D is substituted by 1 or 2 substituents selected from the group consisting of chlorine, methyl, methoxy, R is hydrogen or a β-hydroxyethylsulfonyl or β-sulfatoethylsulfonyl, and Z$^2$ is hydrogen or one or two sulfo groups.

10. A compound according to claim 1, of the formula

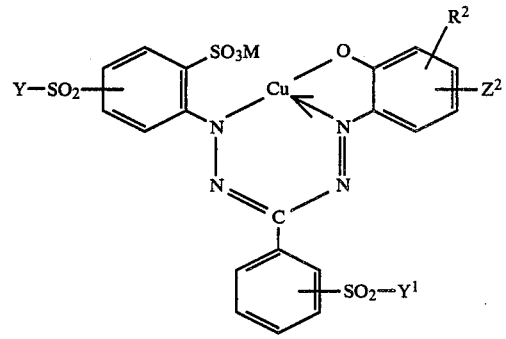

in which R$^2$ is a group of the formula —SO$_2$—Y$^2$, or is an alkylsulfonyl of 1 to 4 carbon atoms, and Z$^2$ is hydrogen or sulfo which is bonded to the benzene ring in ortho-position relative to the oxygen atom.

11. A compound according to claim 10,
in which Z$^2$ is in the para-position relative to the oxy group and is a sulfo group, and R$^2$ is in meta-position relative to Z$^2$ and is hydrogen, acetylamino, methyl, nitro, sulfo or chlorine.

12. A compound according to claim 10, wherein the group —SO$_2$—Y$^1$ is bonded in para-position.

13. A compound according to claim 11, wherein the group —SO$_2$—Y$^1$ is bonded in para-position.

14. A compound according to claim 1, of the formula

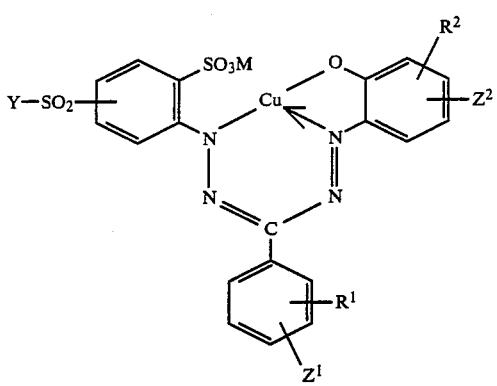
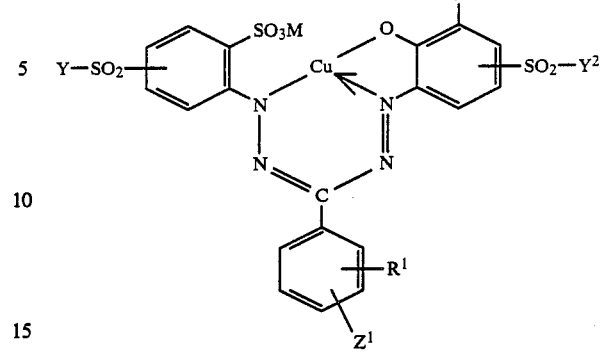

in which $R^1$ is bonded in meta- or para-position relative to the carbon atom of the heterocyclic copper complex ring and is hydrogen, methyl, methoxy or chlorine, $Z^1$ is bonded in meta- or para-position relative to the carbon atom of the heterocyclic copper complex ring and is hydrogen or sulfo, $R^2$ is hydrogen, and $Z^2$ is bonded in para-position relative to the nitrogen atom and is sulfo.

15. A compound according to claim 14,
in which $Z^2$ is sulfo bonded in para-position relative to the oxygen atom, and $R^2$ is bonded in ortho-position relative to the oxygen atom and is hydrogen, chlorine, acetylamino, methyl, nitro or sulfo.

16. A compound according to claim 14,
wherein $Z^2$ is sulfo bonded in ortho-position relative to the oxygen atom, and $R^2$ is bonded in meta-position relative to $Z^2$ and is alkylsulfonyl of 1 to 4 carbon atoms, chlorine, acetylamino or methyl.

17. A compound according to claim 1, of the formula in which $R^1$ is bonded in meta- or para-position relative to the carbon atom of the heterocyclic copper complex ring and is hydrogen, methyl, methoxy or chlorine, $Z^1$ is hydrogen or sulfo bonded in meta- or para-position relative to the carbon atom of the heterocyclic copper complex ring, and X is hydrogen in which case the group $-SO_2-Y^2$ is bonded in ortho- or meta-position relative to X, or X is sulfo relative to which the group $-SO_2-Y^2$ is bonded in meta-position.

18. A compound according to claim 14, wherein $R^1$ or $Z^1$ are bonded to the benzene ring in ortho-position relative to the carbon atom of the copper heterocycle.

19. A compound according to claim 17, wherein $R^1$ or $Z^1$ are bonded to the benzene ring in ortho-position relative to the carbon atom of the copper heterocycle.

20. A compound according to claim 1, wherein Y is $\beta$-sulfatoethyl, $Y^1$ is $\beta$-hydroxyethyl or $\beta$-sulfatoethyl, $Y^2$ is $\beta$-hydroxyethyl or $\beta$-sulfatoethyl, and Y, $Y^1$ and $Y^2$ are identical to or different from one another.

21. A compound according to claim 1, wherein $-SO_2-Y$ is in meta-position relative to the nitrogen atom and at the same time in para-position relative to the group $-SO_3M$.

* * * * *